US012668042B2

(12) United States Patent
Kim et al.

(10) Patent No.: US 12,668,042 B2
(45) Date of Patent: Jun. 30, 2026

(54) PROTECTIVE FILM FOR VEHICLE GLASS WITH HEAT SHIELDING FUNCTION, AND METHOD FOR MANUFACTURING THE SAME

(71) Applicant: STEK CO., LTD., Seoul (KR)

(72) Inventors: Sang Tae Kim, Cheonan-si (KR); Inyoung Kim, Cheonan-si (KR); No Ah Oh, Cheonan-si (KR)

( * ) Notice: Subject to any disclaimer, the term of this patent is extended or adjusted under 35 U.S.C. 154(b) by 62 days.

(21) Appl. No.: 18/744,649

(22) Filed: Jun. 16, 2024

(65) Prior Publication Data
US 2025/0381761 A1     Dec. 18, 2025

(51) Int. Cl.
| | |
|---|---|
| *B32B 17/10* | (2006.01) |
| *B32B 37/26* | (2006.01) |
| *B32B 38/00* | (2006.01) |
| *B32B 38/18* | (2006.01) |

(52) U.S. Cl.
CPC .................. *B32B 17/10018* (2013.01); *B32B 17/10651* (2013.01); *B32B 17/10743* (2013.01); *B32B 17/1077* (2013.01); *B32B 17/10935* (2013.01); *B32B 37/26* (2013.01); *B32B 38/1808* (2013.01); *B32B 2037/268* (2013.01); *B32B 2038/0076* (2013.01); *B32B 2264/102* (2013.01); *B32B 2264/301* (2020.08); *B32B 2305/72* (2013.01); *B32B*

*2307/306* (2013.01); *B32B 2307/4026* (2013.01); *B32B 2307/762* (2013.01); *B32B 2310/0831* (2013.01); *B32B 2315/08* (2013.01); *B32B 2333/08* (2013.01); *B32B 2375/00* (2013.01); *B32B 2605/00* (2013.01)

(58) Field of Classification Search
None
See application file for complete search history.

(56) References Cited

U.S. PATENT DOCUMENTS

| | | | | |
|---|---|---|---|---|
| 2016/0223718 A1* | 8/2016 | Zheng | ...................... | G02B 1/14 |
| 2020/0061967 A1* | 2/2020 | Cho | ...................... | B32B 27/365 |
| 2020/0115592 A1* | 4/2020 | Kim | ........................... | C09J 7/40 |
| 2022/0024194 A1* | 1/2022 | Lee | ...................... | C09D 175/04 |

FOREIGN PATENT DOCUMENTS

WO     WO-2022238864 A1 * 11/2022   ......... C08G 18/4063

* cited by examiner

*Primary Examiner* — Ramsey Zacharia
(74) *Attorney, Agent, or Firm* — Youngil Lee

(57)     ABSTRACT

The present invention relates to a protective film for a vehicle glass with a heat shielding function and a method for manufacturing the same, and more particularly, to a protective film for a vehicle glass with a heat shielding function, which is installed on a curved surface portion of the vehicle glass without a thermoforming process to improve installability of a worker, and has an excellent heat shielding function, and a method for manufacturing the protective film.

7 Claims, 21 Drawing Sheets

FIG.  5A
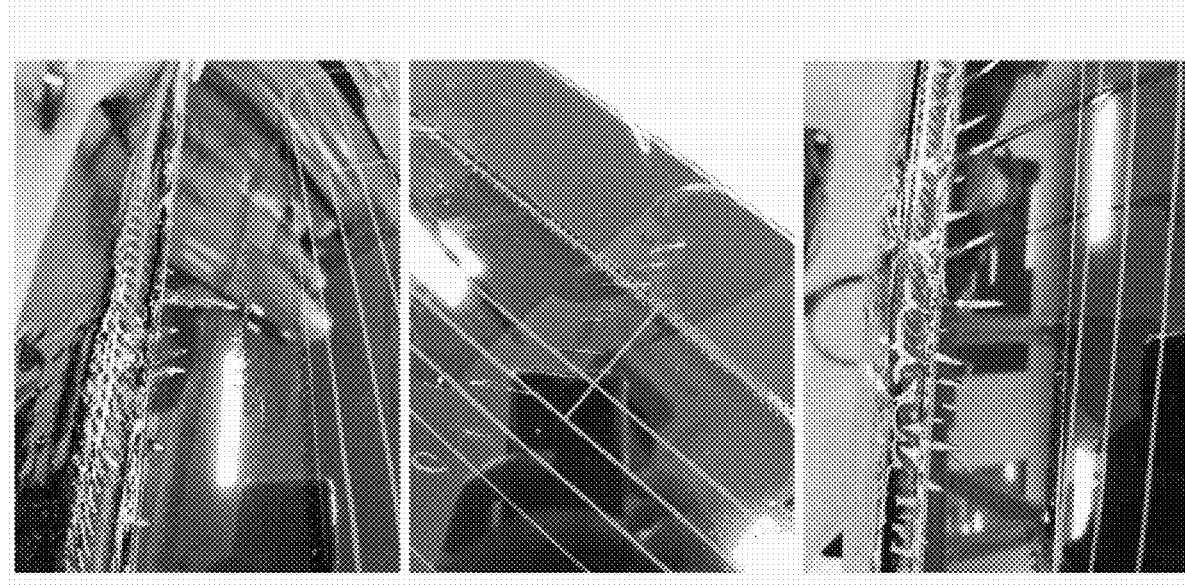
FIG.  5B
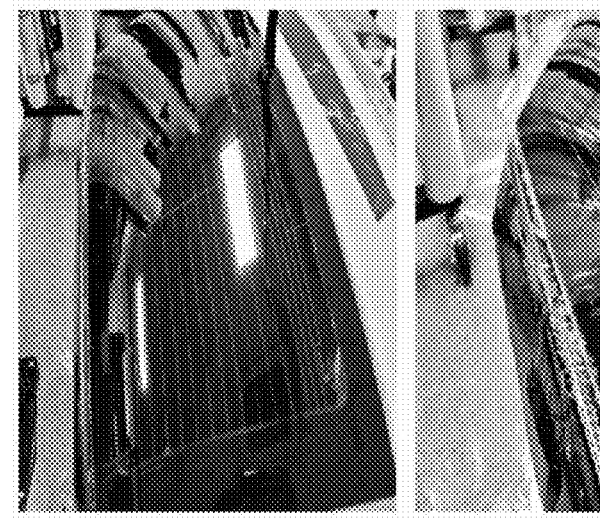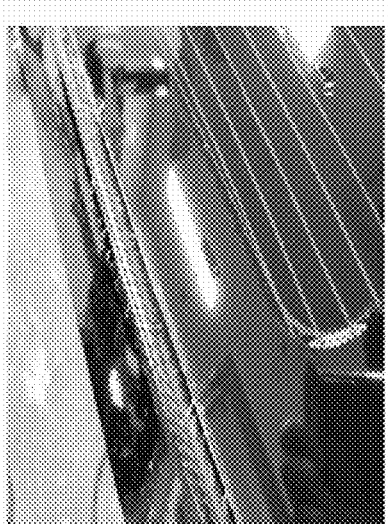

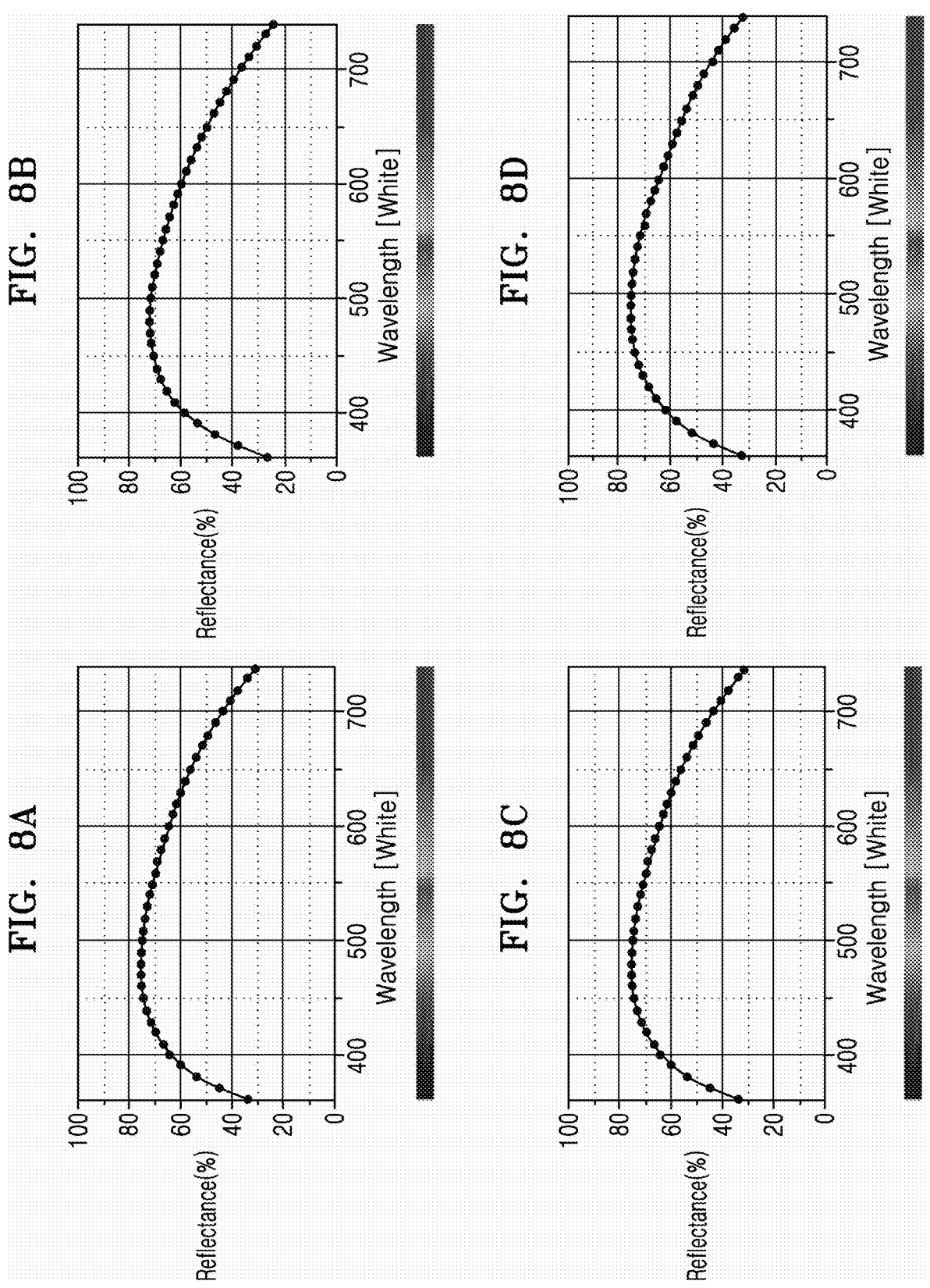

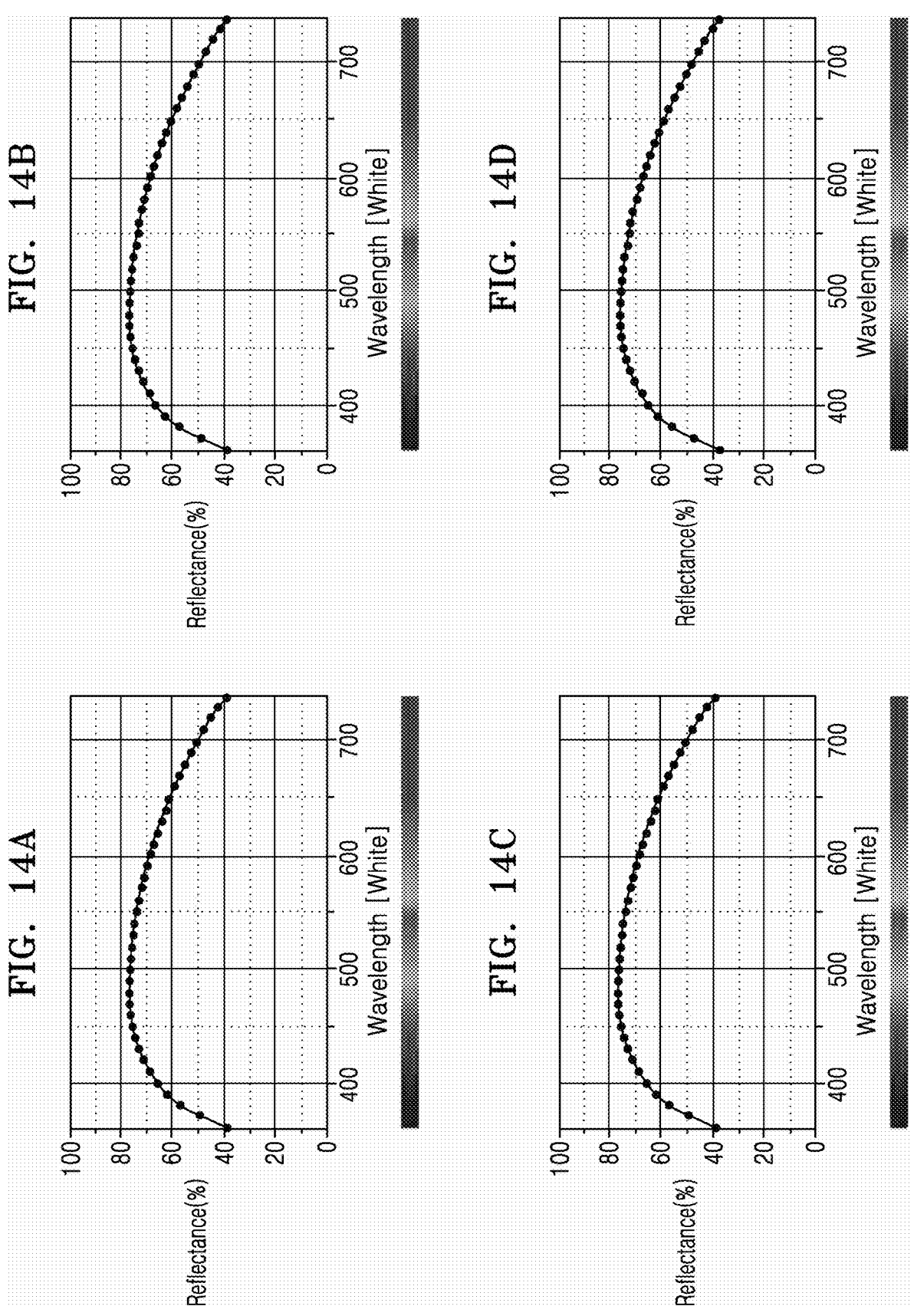

FIG. 15A
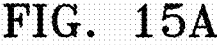
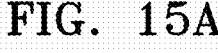
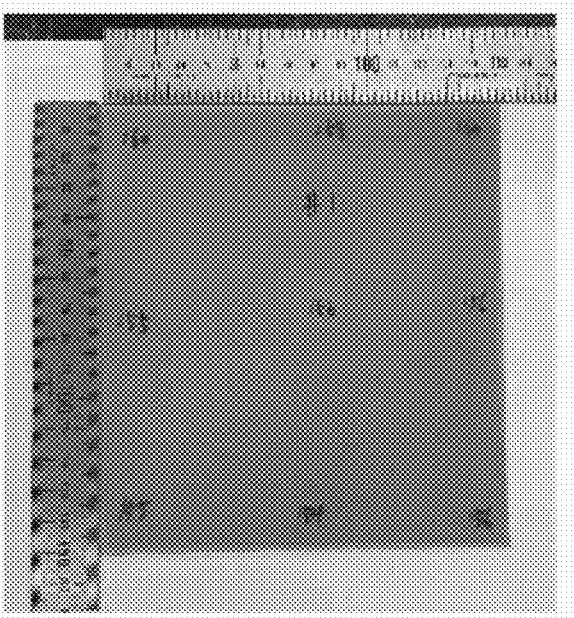
FIG. 15B
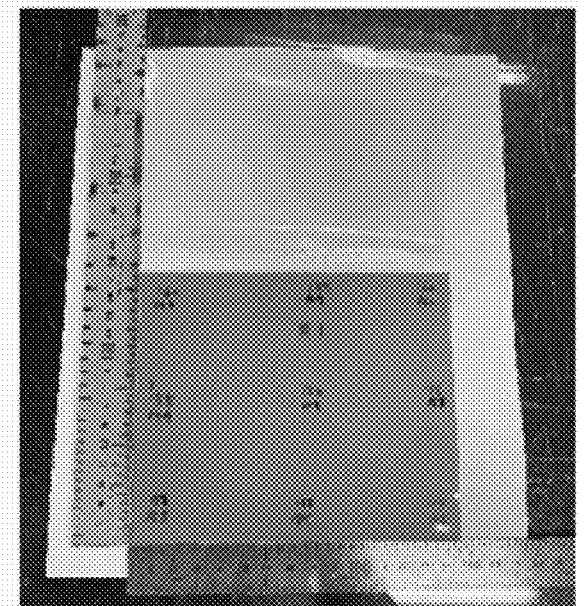
FIG. 15C
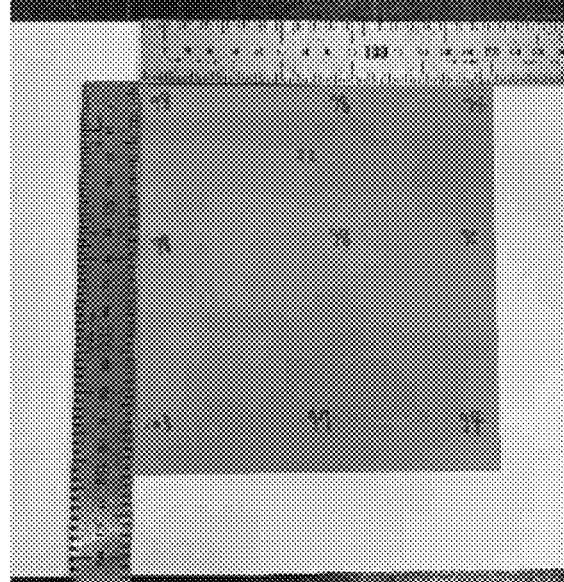
FIG. 15D
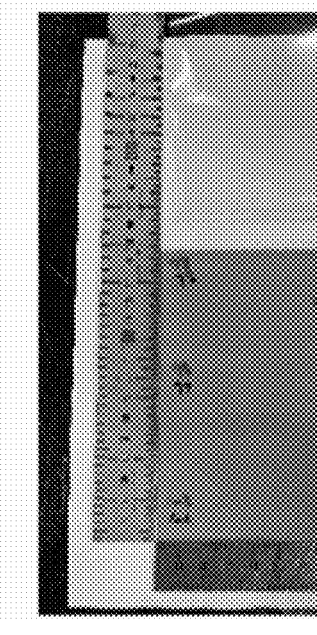

AC03-S01

AC03-S02

AC03-S03

AC03-S04

PROTECTIVE FILM FOR VEHICLE GLASS WITH HEAT SHIELDING FUNCTION, AND METHOD FOR MANUFACTURING THE SAME

BACKGROUND OF THE INVENTION

1. Field of the Invention

The present invention relates to a protective film for a vehicle glass with a heat shielding function and a method for manufacturing the same, and more particularly, to a protective film for a vehicle glass with a heat shielding function, which is installed on a curved surface portion of the vehicle glass without a thermoforming process to improve installability of a worker, and has an excellent heat shielding function, and a method for manufacturing the protective film.

2. Description of the Related Art

Recently, as vehicle-related technologies grow, various sensors have been disposed on a vehicle windshield to provide various functions to a user. However, when the windshield is broken, a plurality of components have to be replaced together with a glass without replacing only the glass, so that a glass replacement cost is significantly increased, and thus interest in protective films for protecting the windshield is increasing.

In general, a vehicle windshield protective film may use a plastic film including PET, PMMA, PC, and the like as a base layer, and hard coating may be performed on a top surface of the base layer to obtain a function of preventing a scratch. However, such a conventional protective film necessarily requires a thermoforming process of applying heat such as hot air when attached to a curved surface portion of the glass, so that a working time may be very long.

Meanwhile, a method for ensuring smoothness of a film upon manufacture of a protective film is being proposed. In particular, a method for manufacturing a film by injecting a resin between two sheets of release paper and performing ultraviolet curing and heat curing on the resin is being spotlighted due to excellent workability thereof.

However, according to such a manufacturing method, a space that allows a solvent of the resin to be volatilized during the ultraviolet curing and the heat curing may not be ensured, so that the film may contract during a process of removing the release paper after the curing. Since the contraction of the film significantly reduces optical properties as well as the smoothness, designed physical properties may not be implemented, so that a solution to such a problem is urgently needed.

SUMMARY OF THE INVENTION

An object of the present invention is to provide a protective film for a vehicle glass with a heat shielding function, which is installed on a curved surface portion of the vehicle glass without a thermoforming process to improve installability of a worker, and has an excellent heat shielding function, and a method for manufacturing the protective film.

To achieve the object described above, according to one embodiment of the present invention, there is provided a protective film for a vehicle glass with a heat shielding function, the protective film including: a colored adhesive layer including an acrylic copolymer and a colored pigment;

a base layer disposed on the colored adhesive layer, and including a mixture solution formed by mixing a resin composition including an acrylic oligomer and a urethane oligomer and a particle dispersion composition including a solid and a solvent with each other; and a self-healing layer disposed on the base layer, including a urethane resin and an isocyanate curing agent, capable of recovering from a scratch, and having an impact resistance, wherein the solid includes nanoceramic powder, a dispersant, and a stabilizer, and the protective film is attached to a curved vehicle windshield without a thermoforming process due to elasticity of the base layer and the self-healing layer so as to protect the vehicle windshield while shielding heat caused by sunlight.

According to some embodiments of the present invention, the base layer may include 1 to 30 parts by weight of the particle dispersion composition based on 100 parts by weight of the mixture solution.

According to some embodiments of the present invention, the base layer may include 30 to 60 parts by weight of the solid based on 100 parts by weight of the particle dispersion composition.

According to some embodiments of the present invention, the solid may include 10 to 200 parts by weight of the dispersant and the stabilizer based on 100 parts by weight of the nanoceramic powder.

According to some embodiments of the present invention, the nanoceramic powder may include one of CTO, ATO, ITO, and $WO_3$.

According to some embodiments of the present invention, the base layer may be formed by preparing the resin composition including the acrylic oligomer and the urethane oligomer, preparing the particle dispersion composition including the solid and the solvent, mixing the prepared resin composition and the prepared particle dispersion composition with each other to form the mixture solution, applying the mixture solution between two sheets of release paper through a preset device, and performing ultraviolet curing on the mixture solution.

According to some embodiments of the present invention, the base layer may be formed on a bottom surface thereof with the colored adhesive layer and formed on a top surface thereof with the self-healing layer, when the colored adhesive layer is formed, the bottom surface of the base layer may be heat-cured during a heat treatment at a temperature of 80 to 150° C. after being coated with an adhesive composition including an acrylic copolymer and a colored pigment, and, when the self-healing layer is formed, the top surface of the base layer may be heat-cured during a heat treatment at a temperature of 80 to 150° C. after being coated with a surface composition including a urethane resin and an isocyanate curing agent.

To achieve the object described above, according to one embodiment of the present invention, there is provided a method for manufacturing a protective film for a vehicle glass with a heat shielding function, the method including: forming a colored adhesive layer including an acrylic copolymer and a colored pigment; forming a base layer, which includes a mixture solution formed by mixing a resin composition including an acrylic oligomer and a urethane oligomer and a particle dispersion composition including a solid and a solvent with each other, on the colored adhesive layer; and forming a self-healing layer, which includes a urethane resin and an isocyanate curing agent, is capable of recovering from a scratch, and has an impact resistance, on the base layer, wherein the solid includes nanoceramic powder, a dispersant, and a stabilizer, and the protective film is attached to a curved vehicle windshield without a thermoforming process due to elasticity of the base layer and the self-healing layer so as to protect the vehicle windshield while shielding heat caused by sunlight.

According to one embodiment of the present invention, an overall protective film may be formed of a material having elasticity, so that the protective film can be installed on a curved surface portion of a vehicle glass without a thermoforming process to improve installability of a worker.

According to one embodiment of the present invention, a base layer may include a particle dispersion composition, so that a heat shielding function of shielding 80% or more of infrared rays can be implemented to protect a glass while adjusting sunlight.

According to one embodiment of the present invention, a protective film having a visible light transmittance that is adjustable in a range of 0.5 to 80% can be provided by a colored pigment added to a colored adhesive layer.

According to one embodiment of the present invention, a particle dispersion composition including a solid, which has an increased content focusing on a dispersant and a stabilizer, and a special solvent may be added to a base layer, so that smoothness and optical properties of the base layer can be ensured, and film contraction during a manufacturing process can be prevented to improve quality of a protective film.

According to one embodiment of the present invention, a colored adhesive layer and a self-healing layer may be prepared by a heat curing scheme on lower and upper sides of a base layer, respectively, so that a residual solvent remaining in the base layer can be volatilized to minimize a solvent content of the base layer.

According to one embodiment of the present invention, a residual solvent in a base layer may be minimized, so that film contraction and curling can be effectively prevented.

BRIEF DESCRIPTION OF THE DRAWINGS

FIGS. 5A and 5B show film attachment test results according to a type of the resin composition according to one embodiment of the present invention.

FIGS. 8A, 8B, 8C, and 8D show optical property test results of the base layer according a heat treatment state of the base layer according to one embodiment of the present invention.

FIGS. 10A, 10B, 10C, and 10D illustratively show photographs of the base layer including the particle dispersion composition before and after the heat treatment according to one embodiment of the present invention.

FIGS. 14A, 14B, 14C, and 14D show optical property test results of the base layer according to the type of the nanoceramic powder according to one embodiment of the present invention.

FIGS. 15A, 15B, 15C, and 15D illustratively show photographs of the base layer including the particle dispersion composition before and after the heat treatment according to one embodiment of the present invention.

DETAILED DESCRIPTION OF THE INVENTION

Figure 1:
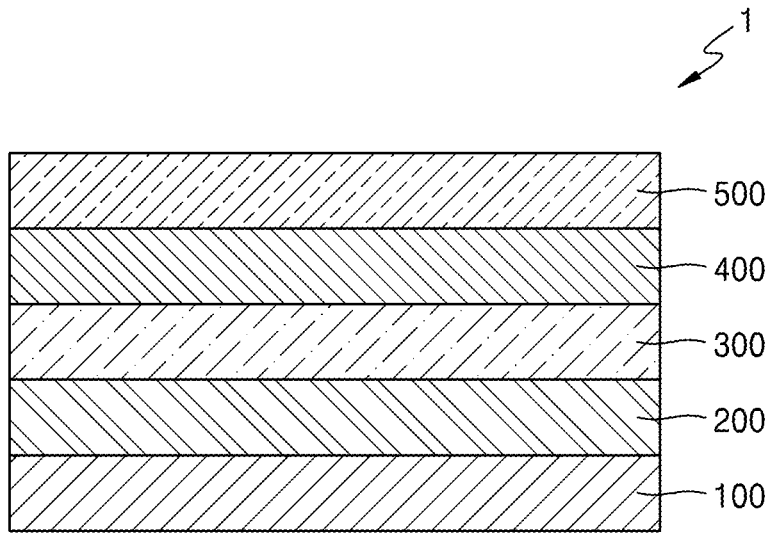
FIG. 1 schematically shows a stacking structure of a protective film for a vehicle glass with a heat shielding function according to one embodiment of the present invention.

Various embodiments and/or aspects will be disclosed with reference to the drawings. In the following description, for the purpose of description, numerous specific details are set forth in order to facilitate an overall understanding of one or more aspects. However, it will also be appreciated by a person having ordinary skill in the art to which the present invention pertains that such aspect(s) may be practiced without the specific details. The following description and the accompanying drawings will be set forth in detail for specific illustrative aspects among the one or more aspects. However, the aspects are provided for illustrative purposes, some of various schemes based on principles of various aspects may be employed, and descriptions set forth herein are intended to include all the aspects and equivalents thereof.

The terms "embodiment", "example", "aspect", "illustration", and the like used herein may not be construed as indicating that any aspect or design set forth herein is preferable or advantageous over other aspects or designs.

Further, the term "or" is intended to signify an inclusive "or" rather than an exclusive "or". In other words, unless otherwise specified or contextually unclear, the expression "X uses A or B" is intended to signify one of natural inclusive substitutions. That is, when X uses A; X uses B; or X uses both A and B, the expression "X uses A or B" may apply to either of the above cases. In addition, it is to be understood that the term "and/or" used herein refers to and includes all possible combinations of one or more of listed relevant items.

In addition, it is to be understood that the terms "include" and/or "comprise" indicate the presence of corresponding features and/or elements, but do not preclude the presence or addition of one or more other features, elements, and/or groups thereof.

Further, in the present disclosure, it is to be understood that singular expressions such as "a (n)" and "the" include plural expressions as well, unless explicitly indicated otherwise. Accordingly, as an example, a "component surface" includes one or more component surfaces.

In addition, although the terms including ordinal numbers such as "first" and "second" may be used to describe various elements, the elements are not limited by the terms. The above terms are used merely for the purpose of distinguishing one element from another element. For example, a first element may be termed as a second element, and similarly, a second element may also be termed as a first element without departing from the scope of the present invention. The term "and/or" includes any combination of a plurality of described relevant items, or one of the described relevant items.

Further, the terms used herein are used only to describe specific embodiments, and are not intended to limit the present invention. Unless the context explicitly indicates otherwise, an expression in a singular form includes a meaning of a plural form as well. In the present disclosure, the term such as "include" or "have" is intended to designate the presence of characteristics, numbers, steps, operations, elements, parts, or combinations thereof described herein, and shall not be construed to preclude any possibility of the presence or addition of one or more other characteristics, numbers, steps, operations, elements, parts, or combinations thereof.

In addition, unless defined otherwise, all terms used in embodiments of the present invention, including technical and scientific terms, have the same meaning as those commonly understood by a person having ordinary skill in the art to which the present invention pertains. Any terms as those defined in generally used dictionaries are to be interpreted to have the meanings consistent with the contextual meanings in the relevant field of art, and are not to be interpreted to have idealistic or excessively formalistic meanings unless explicitly defined in the embodiments of the present invention.

Structure of Protective Film for Vehicle Glass with Heat Shielding Function (hereinafter referred to as "Protective Film")

FIG. 1 schematically shows a stacking structure of a protective film for a vehicle glass with a heat shielding function according to one embodiment of the present invention.

According to one embodiment of the present invention, a protective film for a vehicle glass with a heat shielding function 1 may include: a colored adhesive layer 200 including an acrylic copolymer and a colored pigment; a base layer 300 disposed on the colored adhesive layer, and including a mixture solution formed by mixing a resin composition including an acrylic oligomer and a urethane oligomer and a particle dispersion composition including a solid and a solvent with each other; and a self-healing layer 400 disposed on the base layer, including a urethane resin and an isocyanate curing agent, capable of recovering from a scratch, and having an impact resistance.

In addition, the solid may include nanoceramic powder, a dispersant, and a stabilizer.

In the above configuration, the protective film may be attached to a curved vehicle windshield without a thermoforming process due to elasticity of the base layer and the self-healing layer so as to protect the vehicle windshield while shielding heat caused by sunlight. In addition, an overall protective film may be formed of a material having elasticity, so that the protective film may be installed on a curved surface portion of a vehicle glass without a thermoforming process to improve installability of a worker.

The colored adhesive layer may correspond to a configuration that allows the protective film to be entirely attached to the vehicle glass.

The colored adhesive layer may include an acrylic copolymer and a colored pigment, and such components may correspond to components capable of implementing high adhesive strength between the vehicle glass and the base layer while preventing the film from being torn during a process of removing the protective film by the worker. According to one embodiment of the present invention, the colored adhesive layer may have adhesive strength of 300 to 800 gf/inch based on an adherend glass.

When the colored adhesive layer is applied with a thickness that is less than a preset thickness, a problem may occur in basic physical properties such as adhesive strength and close adhesion to the base layer, and, when the colored adhesive layer is applied with a thickness that is greater than the preset thickness, it may be difficult to adjust smoothness so that visibility may be reduced. According to one embodiment of the present invention, the colored adhesive layer may be applied to have a thickness of 1 to 50 micrometers, preferably 5 to 20 micrometers, and more preferably 10 micrometers.

In addition, the colored adhesive layer may be a configuration for adjusting a visible light transmittance, and may include a colored pigment and an additive.

The colored pigment may include carbon. The colored adhesive layer may adjust a visible light transmittance of the protective film by using the colored pigment such as carbon. According to one embodiment of the present invention, the protective film may implement a visible light transmittance of 0.5 to 80% depending on a usage environment. In addition, according to one embodiment of the present invention, a protective film having a visible light transmittance that is adjustable in a range of 0.5 to 80% may be provided by a colored pigment added to a colored adhesive layer In addition, the colored adhesive layer may correspond to a configuration for adjusting an ultraviolet light transmittance of the protective film together with the self-healing layer. According to one embodiment of the present invention, the protective film may shield 90% or more of ultraviolet rays, preferably 99% or more of ultraviolet rays.

The base layer may correspond to a configuration capable of serving as a base layer while allowing the protective film to have a heat shielding function. In other words, the protective film according to the present invention may implement the heat shielding function in the base layer.

The base layer may be formed by adding the particle dispersion composition including the solid to the resin composition, and may have the heat shielding function due to the particle dispersion composition. The implementation of the heat shielding function by the particle dispersion composition will be described below.

According to one embodiment of the present invention, the base layer may include 1 to 30 parts by weight of the particle dispersion composition based on 100 parts by weight of the mixture solution including the resin composition and the particle dispersion composition. Preferably, the base layer may include 3 to 10 parts by weight of the particle dispersion composition based on 100 parts by weight of the mixture solution.

A composition of the particle dispersion composition may be a composition capable of effectively shielding infrared rays incident on the base layer to allow the overall protective film to implement the heat shielding function. According to one embodiment of the present invention, the base layer may have an infrared rejection rate of 80% or more and a visible light transmittance of 70% or more.

In other words, a base layer may include a particle dispersion composition, so that a heat shielding function of shielding 80% or more of infrared rays may be implemented to protect a glass while adjusting sunlight.

In addition, the base layer may have a thickness of 1 to 500 micrometers, preferably 70 to 300 micrometers, and more preferably 150 micrometers.

The thickness of the base layer may be adjusted according to the purpose for which the protective film is attached based on 150 micrometers. For example, when the protective film is attached to an inside of the vehicle glass, the protective film may have a thickness of 75 micrometers to reduce unit cost and have a thickness similar to an existing window film, and, when the protective film is attached to an outside of the vehicle glass, the protective film may have a thickness of 300 micrometers.

According to one embodiment of the present invention, the resin composition may be formed by mixing and polymerizing 70 to 90 parts by weight of the acrylic oligomer, 35 to 55 parts by weight of the urethane oligomer, and 0.3 to 0.5 parts by weight of a photoinitiator with each other, and adding 0.5 to 1 part by weight of the photoinitiator.

Preferably, the resin composition may be partially precured during a mixing and polymerization process to have an appropriate viscosity that is advantageous for coating. According to one embodiment of the present invention, the resin composition may be polymerized while being irradiated with ultraviolet rays in a stirrer in which nitrogen is accommodated, and may have a viscosity of 130 to 180 cps. When a viscosity of the mixture solution including the resin composition is greater than or equal to 500 cps, in a case where a small amount of wrinkles are generated in upper and lower sheets of release paper due to a tension, the mixture solution may have low fluidity so that a defect in which a wave pattern is formed on a surface of the base layer may occur, and, when the viscosity of the mixture solution including the resin composition is less than or equal to 100 cps, a defect in which the mixture solution flows out of the release paper between the upper sheet of release paper and the lower sheet of release paper may occur. According to one embodiment of the present invention, the base layer including the resin composition may have elongation of 150% or more, tensile strength of 12 Mpa or more, and a Young's modulus of 50 Mpa or more.

In other words, a composition of the resin composition may correspond to a composition capable of ensuring a sufficient field of view for an occupant of a vehicle to which the protective film is attached while suppressing the flow of the mixture solution upon the preparation of the base layer and the occurrence of the wave pattern defect on a film surface.

According to one embodiment of the invention, an oligomer may have a molecular weight of 10,000 to 30,000.

The acrylic oligomer may be a material having various functional groups, which are 1 to 6 or more functional groups, in which the base layer may become soft when the acrylic oligomer has less functional groups, whereas the base layer may become hard when the acrylic oligomer has many functional groups. According to one embodiment of the present invention, the acrylic oligomer may have hardness of 80 A or more based on Shore A hardness. According to one embodiment of the present invention, in order to achieve such hardness, an acrylic oligomer having three functional groups and an acrylic oligomer having five functional groups have been used in addition to an acrylic oligomer having one functional group, which is used as a base, 1 to 10% of the acrylic oligomer having the five functional groups for eliminating stickiness on a surface has been added for additional coating, and 10 to 30% of the acrylic oligomer having the three functional groups has been added for additional hardness adjustment.

The urethane oligomer may be a configuration for providing elasticity to a resin that has been cured, and a resin composition having preset hardness and elasticity may be prepared by adjusting the number and a ratio of functional groups of the acrylic oligomer and the urethane oligomer.

According to one embodiment of the present invention, the particle dispersion composition may include a solid and a solvent. The particle dispersion composition may be configured such that the solid is dispersed throughout the solvent. According to one embodiment of the present invention, the solvent may include MIBK.

According to one embodiment of the present invention, the base layer may include 30 to 60 parts by weight of the solid based on 100 parts by weight of the particle dispersion composition. As described above, the solid may include nanoceramic powder, a dispersant, and a stabilizer. The dispersant may be a configuration for dispersing the nanoceramic powder, and haze of the base layer may be increased when the dispersant is added in a preset range or more. According to one embodiment of the present invention, the solid may include 10 to 200 parts by weight of the dispersant and the stabilizer based on 100 parts by weight of the nanoceramic powder, preferably 50 to 150 parts by weight of the dispersant and the stabilizer based on 100 parts by weight of the nanoceramic powder. In other words, the solid according to the present invention may include a relatively high content of the dispersant and the stabilizer.

In other words, a composition of the solid may correspond to a composition capable of forming the particle dispersion composition such that the nanoceramic powder is uniformly dispersed throughout the solvent by the dispersant while preventing the haze of the base layer from being reduced. According to one embodiment of the present invention, the base layer may have haze of 5% or less, preferably haze of 1% or less.

When the particle dispersion composition is formed such that the solid including the nanoceramic powder is uniformly dispersed throughout the solvent is used to form the base layer as described above, the infrared rays incident on the base layer may be effectively shielded through the nanoceramic powder to allow the base layer to implement the heat shielding function.

According to one embodiment of the present invention, the nanoceramic powder may include one of CTO, ATO, ITO, and $WO_3$.

According to one embodiment of the present invention, the self-healing layer may include 100 parts by weight of the urethane resin and 30 to 50 parts by weight of the isocyanate curing agent. A composition of the self-healing layer may correspond to a composition appropriate for forming a film having excellent elasticity.

The self-healing layer may have a thickness of 1 to 100 micrometers, preferably 10 to 30 micrometers, and more preferably 20 micrometers.

The thickness of the self-healing layer may be a thickness capable of effectively implementing a scratch recovery function of recovering from a scratch, and the self-healing layer according to one embodiment of the present invention may remove scratches after generating the scratches by performing 1,000 reciprocal movements based on Steel wool #0000, a load of 750 g, and a rotation speed of 80 rpm.

In addition, the self-healing layer may further include a slip additive. The slip additive may correspond to a configuration capable of making the surface of the film slippery.

Conventionally, a silicone-based slip additive has been mainly used. While the silicone-based slip additive may have an advantage of excellent compatibility and a low cost, the silicone-based slip additive may have a disadvantage of adhering to oil relatively easily. Such a disadvantage may become even more noticeable when the protective film is attached and used in high-temperature regions, and may expand to problems that hardness of the self-healing layer is reduced by heat, and oil adheres to the silicone-based additive so as not to be easily cleaned.

To solve the above problems, according to the present invention, a fluorine-based slip additive has been used. The fluorine-based slip additive may not adhere to the oil so that the conventional problems may be solved.

In addition, in order to minimize damage to the protective film by ultraviolet rays, the self-healing layer may further include an ultraviolet shielding agent. The self-healing layer including the ultraviolet shielding agent may have an ultraviolet rejection rate of 90% or more. According to one embodiment of the present invention, the self-healing layer may include 5 parts by weight of the ultraviolet shielding agent based on 100 parts by weight of the urethane resin.

The self-healing layer may have a contact angle of 100 degrees or more based on water.

In other words, according to one embodiment of the present invention, through the above configurations, the protective film for the vehicle glass with the heat shielding function may be attached to the outside of the vehicle glass (front, rear, and side) to absorb and disperse an external impact, thereby minimizing an impact applied to the vehicle glass to prevent breakage of the glass.

According to one embodiment of the present invention, the protective film for the vehicle glass with the heat shielding function may have hardness of 80 to 95 A based on Shore A hardness.

When the protective film has hardness of less than 80 A, it may be easy to absorb and disperse an impact while the protective film may be easily torn, so that, in severe cases, the protective film may be damaged by a wiper, and a severe pressing mark may be generated to prevent self-healing of a scratch. When the protective film has hardness of greater than 95 A, the hardness may be too high, so that elasticity of the film may be lost to make recovery impossible.

In other words, the hardness of the protective film may correspond to hardness capable of minimizing a pressing mark that may be generated on the film having the elasticity, and effectively recovering the generated pressing mark.

Meanwhile, as shown in FIG. 1, the protective film for the vehicle glass with the heat shielding function 1 may be configured such that a release film layer 100 may be disposed under the colored adhesive layer, and a protective film layer 500 may be disposed on the self-healing layer.

According to one embodiment of the present invention, the release film layer may include a release film having peeling strength of 20 gf/inch or less. The release film layer may be a configuration for protecting a bottom surface of the protective film, and may have a thickness of 50 to 100 micrometers, preferably 75 micrometers.

According to one embodiment of the present invention, the protective film layer may include a silicone adhesive having adhesive strength within 10 gf/inch. The protective film layer may be a configuration that serves to protect a top surface of the protective film from an external impact until the protective film is used, and may have a thickness of 50 to 100 micrometers, preferably 85 micrometers. When the protective film layer has a thickness that is greater than 100 micrometers, a manufacturing cost of the protective film may be increased, and, when the protective film layer has a thickness that is less than 50 micrometers, the protective film layer may not be appropriate for sufficiently protecting the top surface of the protective film.

Method for Manufacturing Protective Film for Vehicle Glass with Heat Shielding Function According to one embodiment of the present invention, a method for manufacturing a protective film for a vehicle glass with a heat shielding function may include: forming a colored adhesive layer including an acrylic copolymer and a colored pigment; forming a base layer, which includes a mixture solution formed by mixing a resin composition including an acrylic oligomer and a urethane oligomer and a particle dispersion composition including a solid and a solvent with each other, on the colored adhesive layer; and forming a self-healing layer, which includes a urethane resin and an isocyanate curing agent, is capable of recovering from a scratch, and has an impact resistance, on the base layer, Conventionally, TPU in the form of a film has been prepared by melting TPU particles in the form of chips at a high temperature by using a T-die coater and spraying the melted TPU particles uniformly on a PET film. In this process, an exterior of the film may be determined according to flowability and a leveling property (a property that a coating surface spreads smoothly) of high-temperature liquid TPU. Since the TPU is melted by heat, the liquid has a very high temperature, so that a solvent and an additive capable of improving the flowability and the leveling property may not be inserted. In addition, an insufficient coating property may make exterior quality non-uniform, which becomes a factor of a high defect rate upon use in products where visibility is important, such as glass protection products.

Recently, in order to implement an infrared shielding function in a protective film, a method for preparing a resin by adding nano-sized powder and a solvent capable of dispersing the powder, injecting the resin between two sheets of release paper, and forming a film through ultraviolet curing and heat curing is being attempted.

However, conventional film manufacturing methods may significantly reduce smoothness and optical properties of the film, and, in particular, in a case of the recently attempted method, a plurality of problems in which the resin has a low viscosity so as not to be easily cured, and solvent volatilization is difficult so as to cause contraction of the film when a release film is removed may occur.

In other words, in fact, conventionally, the film could not be formed by injecting the resin between the two sheets of release paper.

To solve the above problems, according to the present invention, the base layer of the protective film has been prepared in a special scheme.

In terms of components of the base layer, according to the present invention, a content of the solid, especially a content of the dispersant and the stabilizer of the solid, has been increased, the solvent has been adjusted to prepare the particle dispersion composition, and the particle dispersion composition has been mixed with the resin composition.

Preferably, according to one embodiment of the present invention, the base layer has been formed by preparing the resin composition including the acrylic oligomer and the urethane oligomer, preparing the particle dispersion composition including the solid and the solvent, and mixing the prepared resin composition and the prepared particle dispersion composition with each other to form the mixture solution.

In this case, when the mixture solution is formed, the resin composition and the particle dispersion composition may be milled for 1 to 12 hours, preferably 5 to 7 hours, to form the mixture solution.

As described above, according to one embodiment of the present invention, a particle dispersion composition including a solid, which has an increased content focusing on a dispersant and a stabilizer, and a special solvent may be added to a base layer, so that smoothness and optical properties of the base layer may be ensured, and film contraction during a manufacturing process may be prevented to improve quality of a protective film.

In terms of a process of the base layer, according to the present invention, the base layer has been formed by injecting the mixture solution between two sheets of release paper and performing ultraviolet curing on the mixture solution, and the colored adhesive layer and the self-healing layer have been prepared by a heat curing scheme on lower and upper sides of the base layer, respectively.

According to such a preparation scheme, the base layer may have the above components, so that the conventional problems may not be caused. This will be described through the drawings that will be described below.

Figure 2A:
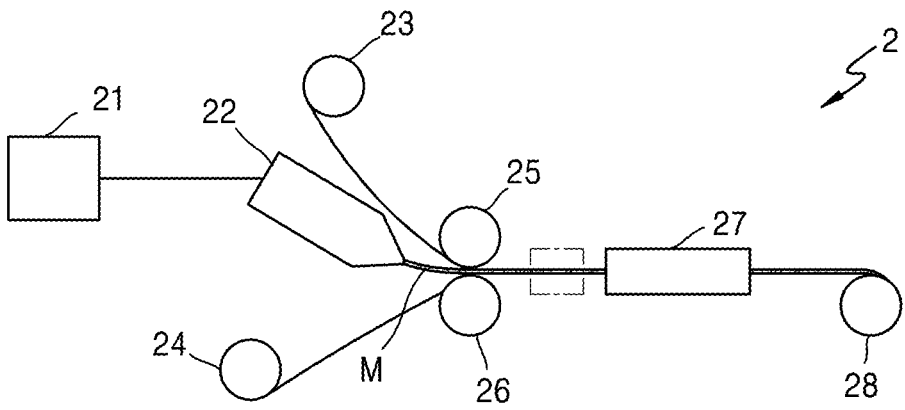
FIGS. 2A and 2B schematically show a state in which a base layer is prepared according to one embodiment of the present invention.
Figure 2B:
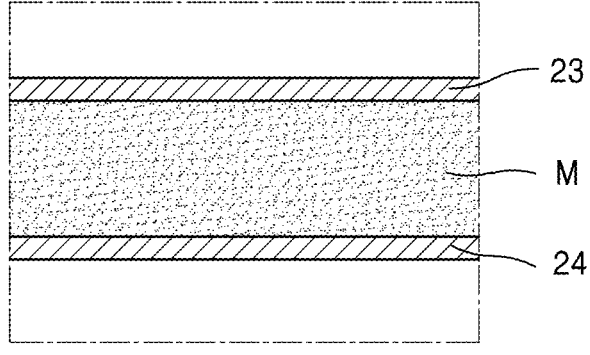

FIGS. 2A and 2B schematically show a state in which a base layer is prepared 2 according to one embodiment of the present invention.

The base layer may be accommodated in a mixture solution supply unit 21 of FIG. 2A in the form of the mixture solution M including the above components. The mixture solution accommodated in the mixture solution supply unit may be discharged into a space between an upper sheet of release paper 23 and a lower sheet of release paper 24 through a supply pump 22 so as to pass through a preset gap maintained between an upper roll 25 and a lower roll 26. In this process, the mixture solution may spread with a uniform thickness, and may be pressed by the upper sheet of release paper and the lower sheet of release paper, which are located on upper and lower sides, respectively, as shown in FIG. 2B to move to an ultraviolet curing chamber 27 while maintaining excellent smoothness. The mixture solution may be irradiated with ultraviolet rays while passing through the ultraviolet curing chamber to form the base layer as a liquid is solidified or volatilized, and the formed base layer may be wound around a base layer winding roll 28 to complete the preparation. Since the mixture solution may emit much heat while passing through the ultraviolet curing chamber, the ultraviolet curing chamber may be preferably filled with cooled air to rapidly remove the heat.

As described above, according to the above preparation scheme, the base layer may have the above components, so that problems may not be caused.

In more detail, conventionally, there were problems in which the resin has a low viscosity so as not to be easily cured, and it is structurally difficult for the solvent of the resin to volatilize due to a structure in which the resin is discharged between two sheets of release paper so as to cause contraction of the film when a release film is removed. In contrast, according to the present invention, as described above, the base layer may be prepared by using the mixture solution formed by increasing the content of the solid, especially the content of the dispersant and the stabilizer of the solid, adjusting the solvent to prepare the particle dispersion composition, and mixing the particle dispersion composition with the resin composition, so that the solvent of the mixture solution may be volatilized more effectively during the ultraviolet curing to prevent the base layer from contracting when the upper sheet of release paper and the lower sheet of release paper are removed, and the base layer may be easily cured.

In addition, although not shown in FIG. 2, according to one embodiment of the present invention, after the base layer is formed, the colored adhesive layer and the self-healing layer may be prepared by a heat curing scheme on lower and upper sides of the base layer.

Preferably, according to one embodiment of the present invention, when the colored adhesive layer is formed, a bottom surface of the base layer may be heat-cured during a heat treatment at a temperature of 80 to 150° C. after being coated with an adhesive composition including an acrylic copolymer and a colored pigment, and, when the self-healing layer is formed, a top surface of the base layer may be heat-cured during a heat treatment at a temperature of 80 to 150° C. after being coated with a surface composition including a urethane resin and an isocyanate curing agent.

Due to the above configuration, a colored adhesive layer and a self-healing layer may be prepared by a heat curing scheme on lower and upper sides of a base layer, respectively, so that a residual solvent remaining in the base layer may be volatilized to minimize a solvent content of the base layer. The residual solvent may act as a factor of reducing physical properties of the film, and, when the factor is not controlled, the base layer may contract by about 5 to 10% upon the formation of the base layer.

In particular, according to the manufacturing method of the present invention in which the resin is formed as a film between the two sheets of release paper, when the residual solvent is not removed, unlike the release film that does not contract due to the heat, severe curls may occur throughout the base layer, so that a coating process may not be performed.

In other words, according to the manufacturing method of the present invention, a residual solvent in a base layer may be minimized, so that film contraction and curling may be effectively prevented.

Test Results Related to Base Layer

Hereinafter, results of performing a plurality of tests on a base layer of a protective film for a vehicle glass with a heat shielding function according to the present invention will be described.

Before performing the tests, a preliminary test was performed first.

The preliminary test was intended to check whether curing is possible after nanoceramic powder is added to a resin composition (UV-curable resin), in which each type of nanoceramic powder that will be described below was added to a resin used in the related art of the present applicant so as to perform the test. In the present test, CTO was used as the nanoceramic powder.

CTO #1:80 um CTO 25 pt
CTO #2:80 um CTO 27 pt
CTO #3:50 um CTO 26 pt

Figures 3A, 3B, 3C:
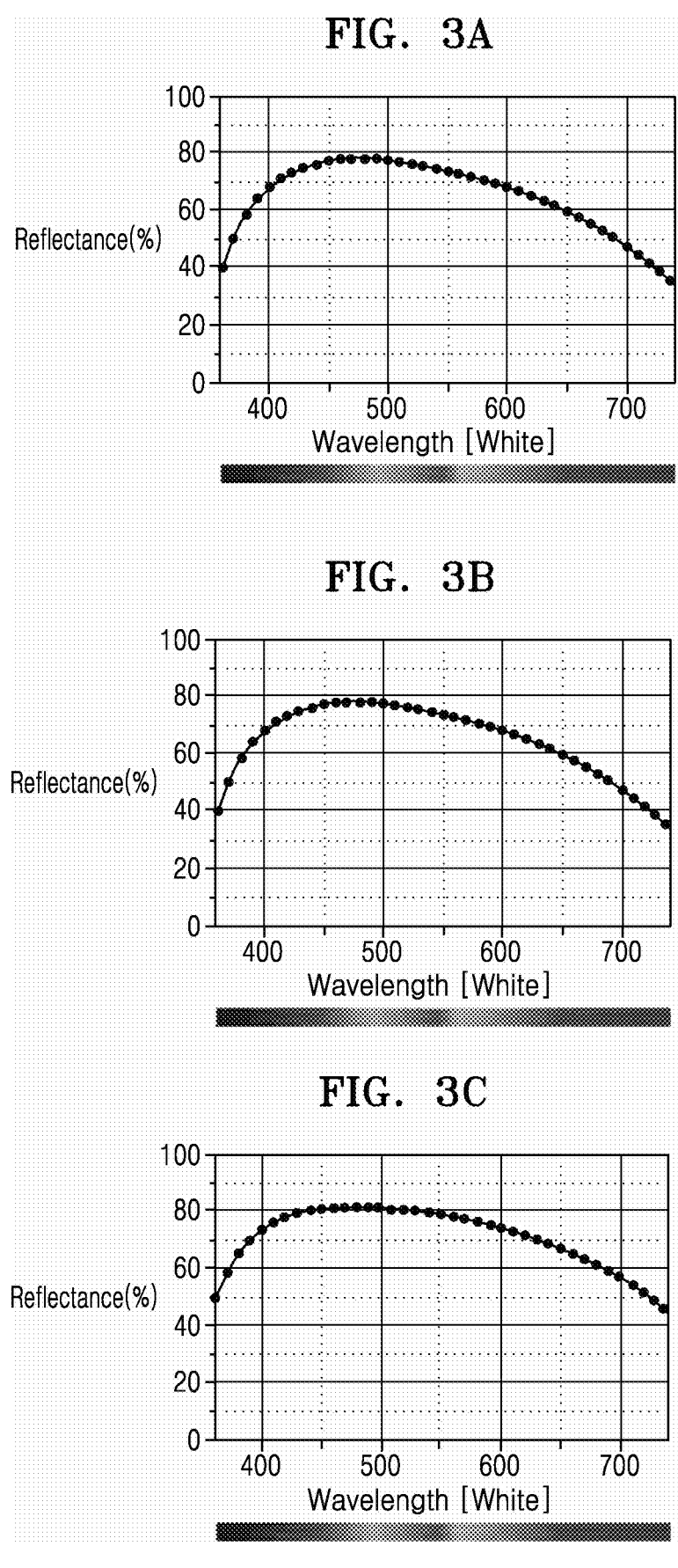
FIGS. 3A, 3B, and 3C show optical property test results of the base layer according to a type of nanoceramic powder according to one embodiment of the present invention.

FIGS. 3A, 3B, and 3C show optical property test results of the base layer according to a type of nanoceramic powder according to one embodiment of the present invention, optical properties of each type of the nanoceramic powder are shown in Table 1, and physical properties of each type of the nanoceramic powder are shown in Table 2.

TABLE 1

| Nanoceramic Powder Type | Haze | Y | L* | a* | b* | VLT | UVR | IRR |
|---|---|---|---|---|---|---|---|---|
| CTO #1 (FIG. 3A) | 0.62 | 72.31 | 88.12 | −5.56 | −3.01 | 75.47 | 55.30 | 95.73 |
| CTO #2 (FIG. 3B) | 0.68 | 71.99 | 87.97 | −5.62 | −3.14 | 72.97 | 58.80 | 97.63 |
| CTO #3 (FIG. 3C) | 0.56 | 76.88 | 90.27 | −4.62 | −2.29 | 79.30 | 46.90 | 90.27 |

TABLE 2

| CTO Type | Direction | Elongation (%) | Max Load (gf) | Tensile Strength (Mpa) | Young's Modulus (Mpa) |
|---|---|---|---|---|---|
| CTO #1 | MD | 131 | 1588 | 9.74 | 58.95 |
| | TD | 121 | 1533 | 9.40 | 72.93 |
| CTO #2 | MD | 138 | 1738 | 10.65 | 66.08 |
| | TD | 117 | 1476 | 9.05 | 69.03 |
| CTO #3 | MD | 116 | 1206 | 10.76 | 76.66 |
| | TD | 121 | 1272 | 11.34 | 74.11 |

As a result of the preliminary test, CTO #1 gelled immediately when mixed with the resin composition, CTO #2 had an increased viscosity without being gelled, and CTO #3 had a slowest gelling speed.

In a case of CTO #2, a test according to an addition amount was additionally conducted, in which, although the gelling speed is slow, the gelling speed was gradually increased as the addition amount increases, and, when CTO #2 is added by 30%, CTO #2 completely gelled after about 2 hours. Analysis results of a visible light transmittance and an infrared rejection rate according to the addition amount of CTO #2 are shown in Table 3.

TABLE 3

| Addition Amount (%) | Application Thickness (um) | VLT (Visible Light Transmittance, %) | IRR (Infrared Rejection Rate, %) |
|---|---|---|---|
| 10 | 75-80 | 80 | 72 |
| 20 | 70 | 75 | 83 |
| 30 | 70 | 75 | 93 |

In addition, in a case of CTO #3, a test according to an addition amount was additionally conducted, in which, when CTO #3 is added by 15%, physical properties of VLT 71% and IRR 96% were implemented upon application with an application thickness of 70 um. While an optical property limit of a window film is generally 70/90 (VLT/IRR), physical properties of 70/95 may be implemented in the preliminary test. This is due to a transmittance of PET, which has been conventionally used as a base layer of the window film. According to one embodiment of the present invention, while transparent PET having a thickness of 75 um has a VLT of about 83%, the protective film to which the base layer according to the present invention formed of a UV-curable resin is applied may have a VLT of about 90%. Due to such a VLT difference, a higher VLT may be implemented in the present invention even with the same IRR.

Primary Test of Base Layer

The present test was intended to check whether the base layer may implement the same physical properties as the preliminary test even in an environment corresponding to an actual production line. In addition, the present test was intended to check whether the gelling speed obtained in the preliminary test may be improved.

The preliminary test showed that the cause of the gelling was an effect of the dispersant added to each of the additive and the resin, and the gelling may be prevented by reducing a content of the dispersant or by using a different dispersant.

Accordingly, tests were conducted by using Resin Composition #1 and Resin Composition #2 that will be described below, and physical properties according to the resin composition are shown in Table 4. Both Resin Composition #1 and Resin Composition #2 correspond to transparent-type resin compositions.

Resin Composition #1:80 parts by weight of an acrylic oligomer, 45 parts by weight of a urethane oligomer, and 0.5 part by weight of a photoinitiator Resin Composition #2:90 parts by weight of an acrylic oligomer, 35 parts by weight of a urethane oligomer, and 0.5 part by weight of a photoinitiator

TABLE 4

| Resin Composition Type | Direction | Elongation (%) | Max Load (gf) | Tensile Strength (Mpa) | Young's Modulus (Mpa) |
|---|---|---|---|---|---|
| Resin Composition #1 | MD | 110 | 1909 | 11.71 | 48.60 |
| | TD | 91 | 1492 | 9.15 | 50.31 |
| Resin Composition #2 | MD | 102 | 2327 | 14.27 | 130.59 |
| | TD | 98 | 2270 | 13.92 | 145.89 |
| Resin Composition #1 (Lab) | MD | 118 | 1538 | 9.43 | 20.90 |
| | TD | 93 | 1077 | 6.60 | 20.85 |

As shown in Table 4, Resin Composition #1 and Resin Composition #2 had generally lower tensile strength than existing known transparent-type resin compositions, and had very low hardness as compared with an actual transparent film so as to be easily cut.

Figures 4A, 4B, 4C:
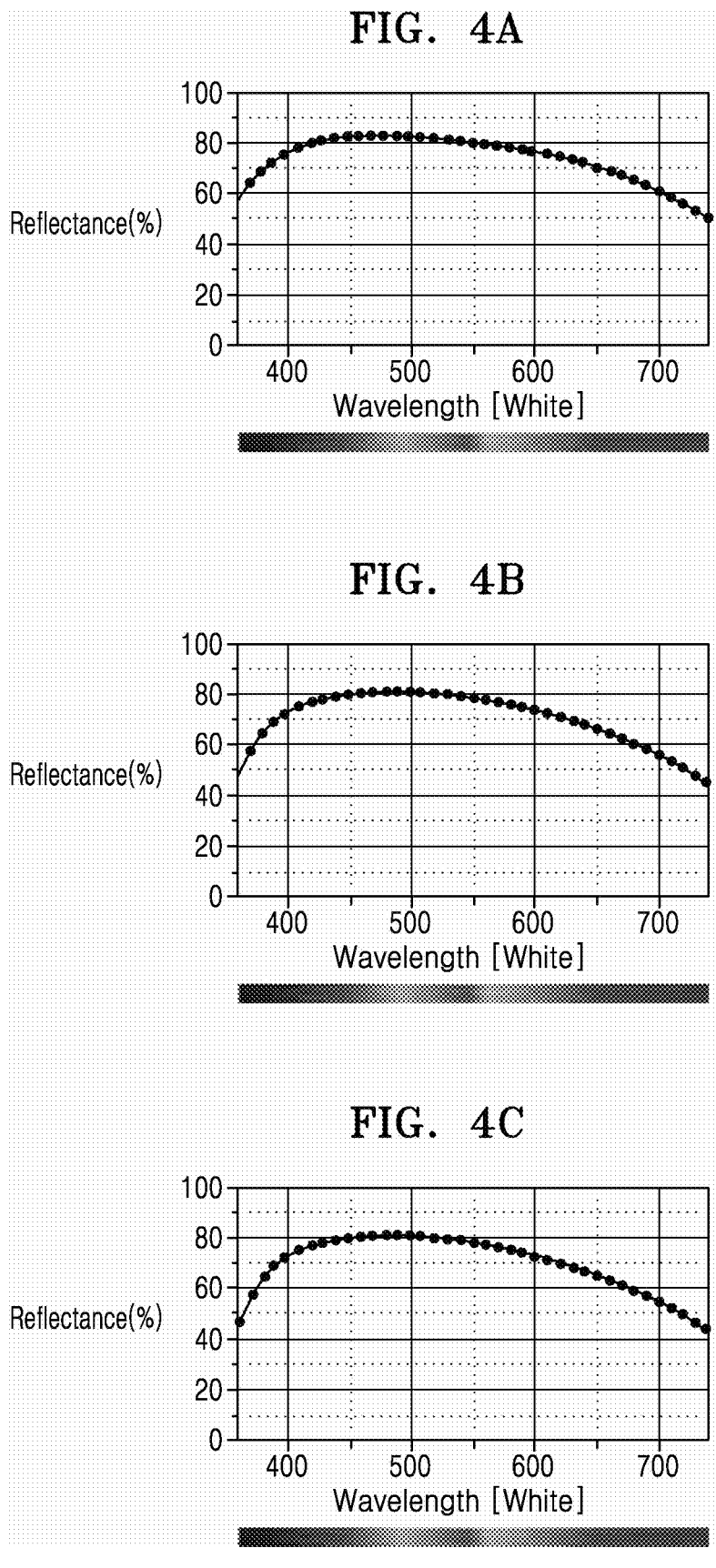
FIGS. 4A, 4B, and 4C show optical property test results of a resin composition according to one embodiment of the present invention.

FIGS. 4A, 4B, and 4C show optical property test results of a resin composition according to one embodiment of the present invention, and Table 5 summarizes the test results.

TABLE 5

| Resin Composition Type | Haze | Y | L* | a* | b* | VLT | UVR | IRR |
|---|---|---|---|---|---|---|---|---|
| Resin Composition #1 (FIG. 4A) | 1.13 | 78.66 | 91.08 | −3.55 | −1.92 | 80.2% | 46.1% | 86.2% |
| Resin Composition #2 (FIG. 4B) | 0.45 | 76.50 | 90.09 | −4.27 | −2.08 | 79.2% | 48.4% | 90.6% |
| Resin Composition #1 (Lab) (FIG. 4C) | 0.92 | 75.53 | 89.64 | −4.54 | −2.72 | 76.1% | 54.6% | 95.7% |

Haze: Degree of opacity due to diffusion of light
Y: Light transmittance
L*: White/black color value, which gradually becomes closer to white as the value increases, and gradually becomes closer to black as the value decreases (−100 to +100)
a*: Red/green color value, which gradually becomes closer to red as the value increases, and gradually becomes closer to green as the value decreases (−100 to +100)
b*: Yellow/blue color value, which gradually becomes closer to yellow as the value increases, and gradually becomes closer to blue as the value decreases (−100 to +100)
VLT: Visible light transmittance
IRR: Infrared rejection rate As shown in FIG. 4 and Table 5, Resin Composition #2 had the lowest haze, and implemented a VLT of about 80% and an IRR of 90% or more.

Secondary Test of Base Layer

In the present test, a test corresponding to the primary test of the base layer was performed by using Resin Composition #3, which was not used in the primary test of the base layer. Resin Composition #3:85 parts by weight of an acrylic oligomer, 40 parts by weight of a urethane oligomer, and 0.5 part by weight of a photoinitiator As a result of the test, similar to the primary test of the base layer, Resin Composition #3 had lower tensile strength than the transparent-type resin compositions.

Tertiary Test of Base Layer

The present test was intended to check whether Resin Composition #4 having relatively low hardness as compared with Resin Composition #3 and Resin Composition #3 may be produced.

Resin Composition #4:70 parts by weight of an acrylic oligomer, 55 parts by weight of a urethane oligomer, and 0.5 part by weight of a photoinitiator In order to attach a protective film to a curved surface portion of a vehicle glass without a thermoforming process, the protective film may preferably have relatively low hardness. In other words, the present test was intended to check whether a protective film that may be installed without a thermoforming process may be produced according to a type of resin composition.

FIGS. 5A and 5B show film attachment test results according to a type of the resin composition according to one embodiment of the present invention.

As a result of the test, Resin Composition #3 had very high hardness as compared with Resin Composition #4, so that the film was wrinkled or folded without stretching during an installation process as shown in FIG. 5A. In other words, Resin Composition #3 necessarily requires the thermoforming process when attached to the vehicle glass, and may not be appropriate for implementing the protective film according to the present invention.

Meanwhile, Resin Composition #4 had no problems with the attachment as shown in FIG. 5B.

Figure 6A:
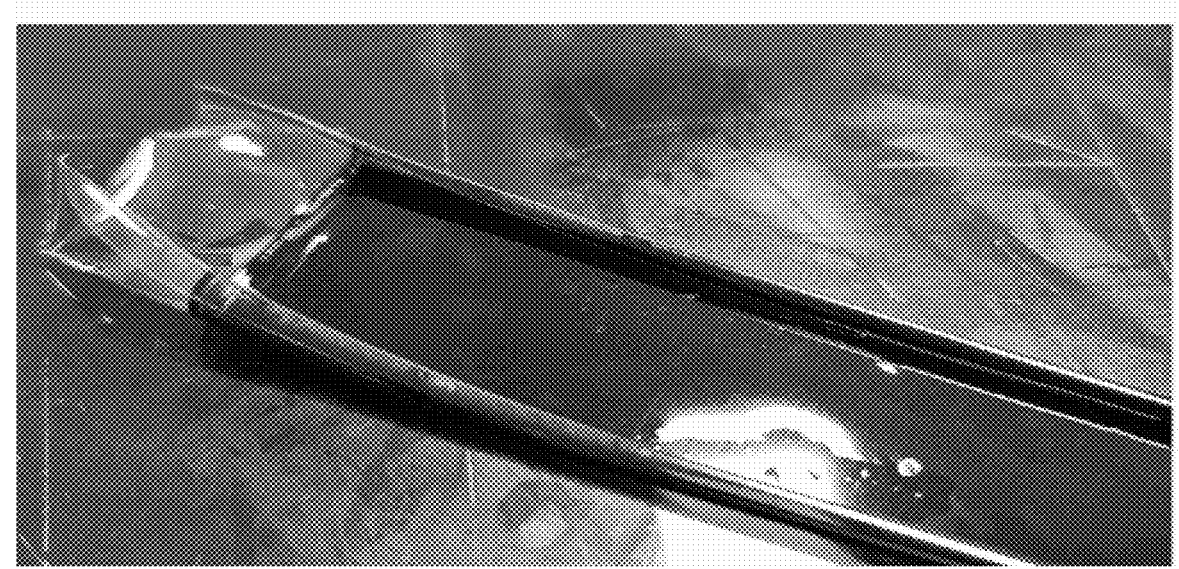
FIGS. 6A and 6B show finished product producibility test results of the resin composition according to one embodiment of the present invention.
Figure 6B:
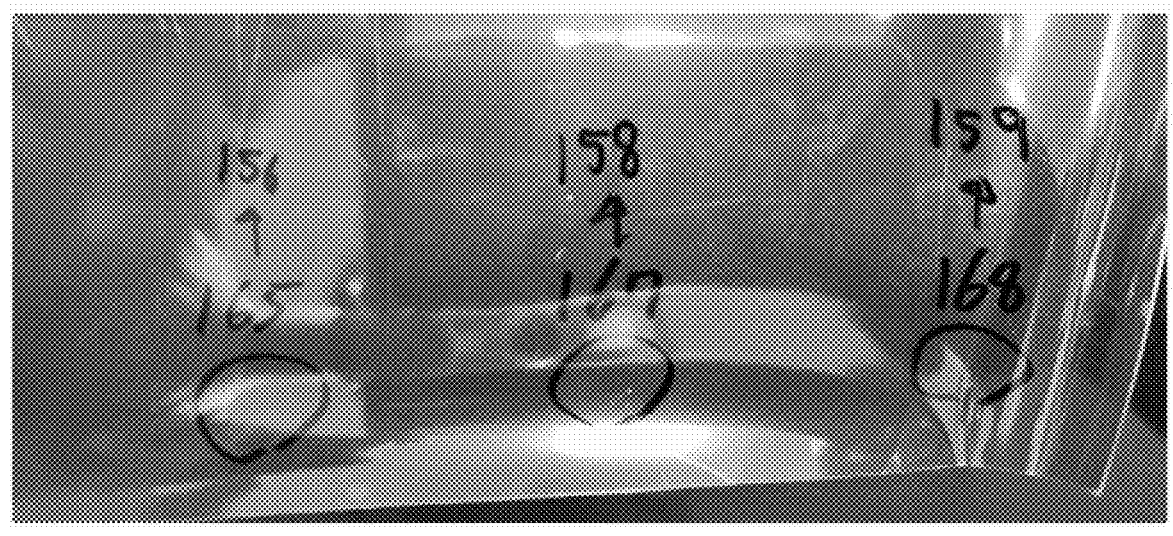
Figures 7A, 7B, 7C, 7D:
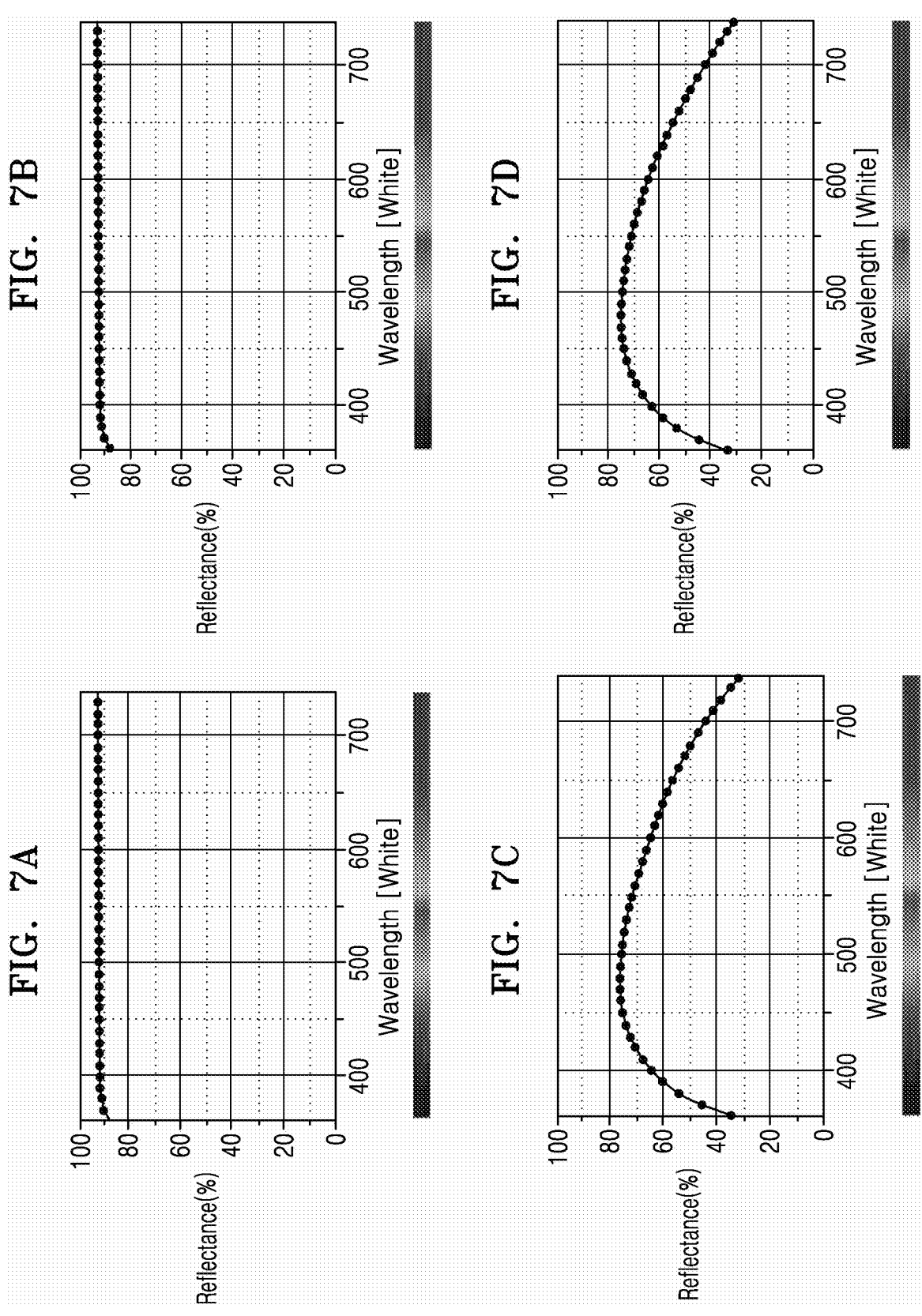
FIGS. 7A, 7B, 7C, and 7D show optical property test results of the base layer according to an inclusion state of the nanoceramic powder according to one embodiment of the present invention.

FIGS. 6A and 6B show finished product producibility test results of the resin composition according to one embodiment of the present invention.

In addition, as a result of testing whether the resin composition may be produced as a finished product, there was no problem with close adhesion or curing when a self-healing layer and a colored adhesive layer are formed on upper and lower sides of the base layer including the resin composition, respectively.

However, as shown in FIGS. 6A and 6B, the film contracted during a drying process. In particular, the film had a strong solvent smell before drying, and the smell completely disappeared after the film is dried at 130 degrees for 7 minutes. In this case, the solvent contained in the film evaporated to cause contraction of the base layer as well as reduction of the thickness.

Even when such a phenomenon occurs, there is no change in the optical properties of the film. However, when the contraction occurs, the production may not be performed.

Quaternary Test of Base Layer

The present test was intended to check whether the contraction of the base layer is suppressed when a content of the solid is increased.

In the present test, the content of the solid was increased to 75 parts by weight based on 100 parts by weight of the particle dispersion composition. A case where 75 parts by weight or more of the solid is added may not be appropriate for the nanoceramic powder of the solid to be easily dispersed.

As a result of the test, the contraction of the thickness that occurred by 5 to 10% in the tertiary test of the base layer was improved to 0 to 1% by using 75 parts by weight of the solid.

Meanwhile, while the base layer adjusts infrared rays, the colored adhesive layer may adjust visible rays and ultraviolet rays. In this case, the colored adhesive layer may adjust the ultraviolet rays by using a known UV shielding agent, and implement a color by using a colored pigment such as carbon.

FIGS. 7A, 7B, 7C, and 7D show optical property test results of the base layer according to an inclusion state of the nanoceramic powder according to one embodiment of the present invention, Table 6 summarizes optical property values for each base layer including each sample, and Table 7 summarizes physical properties for each base layer including each sample.

TABLE 6

| Sample | Haze | Y | L* | a* | b* | VLT | UVR | IRR |
|---|---|---|---|---|---|---|---|---|
| Resin Composition #1 (FIG. 7A) | 0.40 | 92.04 | 96.84 | 0.01 | 0.16 | 93.6 | 8.9 | 6.8 |
| Resin Composition #2 (FIG. 7B) | 0.38 | 92.25 | 96.93 | 0.01 | 0.14 | 94.0 | 8.6 | 6.3 |

TABLE 6-continued

| Sample | Haze | Y | L* | a* | b* | VLT | UVR | IRR |
|---|---|---|---|---|---|---|---|---|
| CTO #1 (FIG. 7C) | 1.03 | 69.77 | 86.88 | −6.08 | −3.33 | 72.8 | 60.3 | 97.6 |
| CTO #2 (FIG. 7D) | 1.43 | 68.77 | 86.39 | −6.21 | −3.15 | 72.3 | 61.6 | 97.61 |

TABLE 7

| Sample | Direction | Elongation (%) | Max Load (gf) | Tensile Strength (Mpa) | Young's Modulus (Mpa) |
|---|---|---|---|---|---|
| Resin Composition #1 (FIG. 7A) | MD | 78.3 | 3831.5 | 23.5 | 497.2 |
| | TD | 83.9 | 3766.8 | 23.1 | 488.7 |
| Resin Composition #2 (FIG. 7B) | MD | 114.4 | 3081.2 | 18.9 | 197.0 |
| | TD | 137.1 | 3510.6 | 21.5 | 176.5 |
| CTO #1 (FIG. 7C) | MD | 104.1 | 2061.1 | 12.6 | 102.2 |
| | TD | 107.0 | 2145.6 | 13.2 | 91.3 |
| CTO #2 (FIG. 7D) | MD | 96.2 | 565.8 | 3.5 | 7.7 |
| | TD | 114.3 | 724.1 | 4.4 | 8.2 |

FIGS. 8A, 8B, 8C, and 8D show optical property test results of the base layer according a heat treatment state of the base layer according to one embodiment of the present invention, Table 8 summarizes optical property values for each base layer including each sample, and Table 9 summarizes physical properties for each base layer including each sample.

TABLE 8

| Sample | Haze | Y | TX | a* | b* | VLT | UVR | IRR |
|---|---|---|---|---|---|---|---|---|
| CTO #1 Drying at Room Temperature for 24 hours (FIG. 8A) | 1.16 | 69.08 | 86.54 | −6.17 | −3.28 | 72.3 | 61.4 | 97.7 |
| CTO #2 Drying at Room Temperature for 24 hours (FIG. 8B) | 2.30 | 63.82 | 83.86 | −7.40 | −3.86 | 68.7 | 68.2 | 99.0 |
| CTO #1 Drying at 85 degrees for 24 hours (FIG. 8C) | 1.28 | 68.87 | 86.44 | −6.28 | −3.04 | 71.8 | 63.3 | 98.0 |
| CTO #2 Drying at 85 degrees for 24 hours (FIG. 8D) | 1.92 | 68.17 | 86.09 | −6.27 | −2.66 | 71.0 | 64.3 | 98.1 |

TABLE 9

| Sample | Direction | Elongation (%) | Max Load (gf) | Tensile Strength (Mpa) | Young's Modulus (Mpa) |
|---|---|---|---|---|---|
| CTO #1 Drying at Room Temperature for 24 hours (FIG. 8A) | MD | 85.0 | 3171.0 | 19.4 | 354.8 |
| | TD | 83.3 | 3369.5 | 20.7 | 355.5 |
| CTO #2 Drying at Room Temperature for 24 hours (FIG. 8B) | MD | 136.5 | 2059.2 | 12.6 | 35.1 |
| | TD | 168.8 | 3048.6 | 18.7 | 38.4 |
| CTO #1 Drying at 85 degrees for 24 hours (FIG. 8C) | MD | 75.2 | 5204.4 | 31.9 | 616.5 |
| | TD | 40.8 | 5167.1 | 31.7 | 650.6 |
| CTO #2 Drying at 85 degrees for 24 hours (FIG. 8D) | MD | 150.5 | 2989.9 | 18.3 | 197.5 |
| | TD | 141.1 | 2966.5 | 18.2 | 159.3 |

Meanwhile, similar to the tertiary test of the base layer, the base layer may be dried at 130 degrees for 7 minutes. In this case, the contraction of the base layer may occur. Hereinafter, test results related to a contraction issue of the base layer will be described.

FIGS. 9A, 9B, 9C, and 9D illustratively show photographs of a base layer that does not include the particle dispersion composition before and after a heat treatment according to one embodiment of the present invention.

Figures 9A, 9B, 9C, 9D:
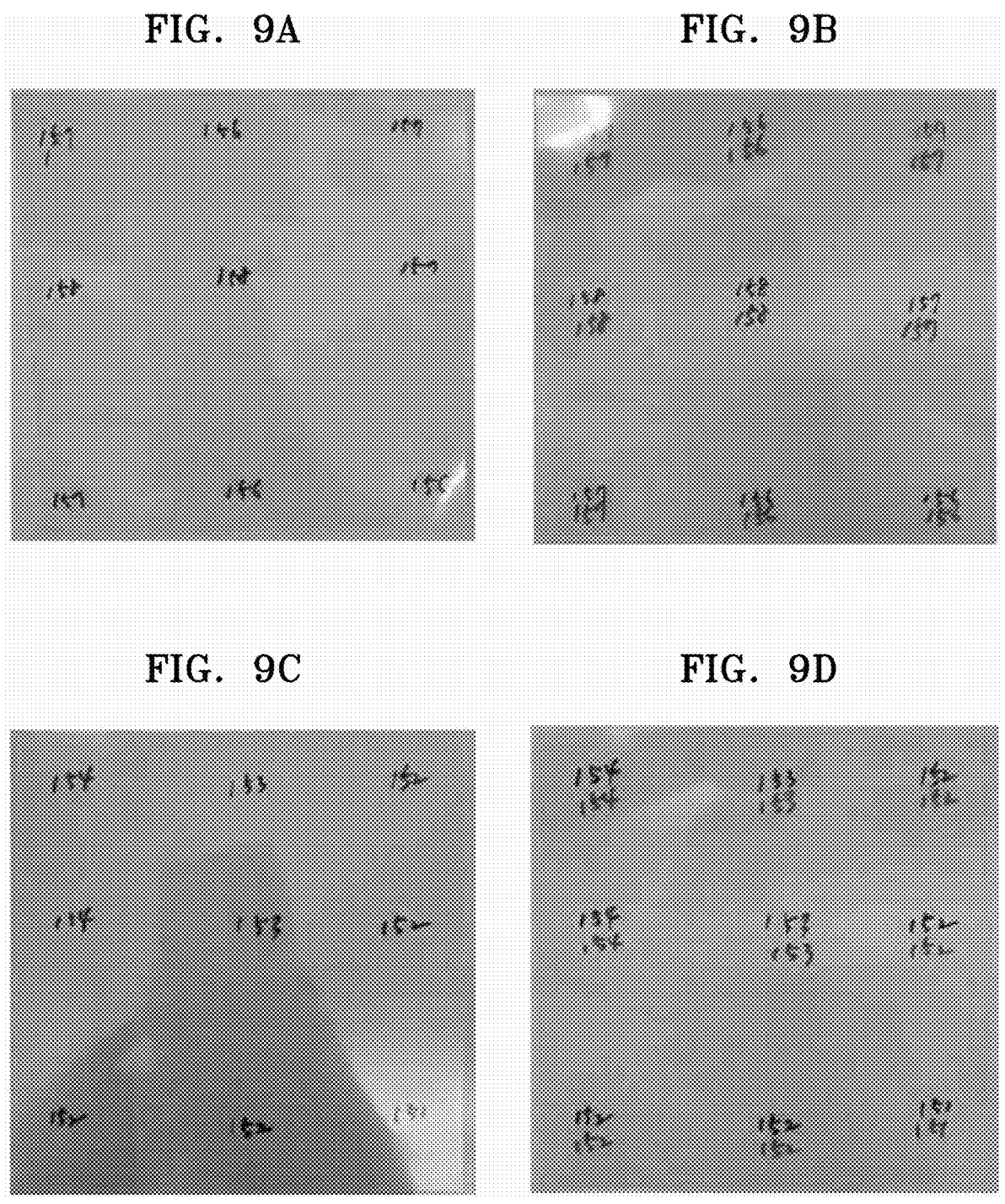
FIGS. 9A, 9B, 9C, and 9D illustratively show photographs of a base layer that does not include the particle dispersion composition before and after a heat treatment according to one embodiment of the present invention.

FIG. 9A shows a state in which a heat treatment is not performed on the base layer including Resin Composition #1, FIG. 9B shows a state in which a heat treatment is performed on the base layer including Resin Composition #1, FIG. 9C shows a state in which a heat treatment is not performed on the base layer including Resin Composition #2, and FIG. 9D shows a state in which a heat treatment is performed on the base layer including Resin Composition #2.

As shown in FIGS. 9B and 9D, the base layer that does not include the particle dispersion composition did not contract even after the heat treatment (drying) at 130 degrees for 7 minutes. Table 10 summarizes physical properties (including a contraction rate) for each base layer including each sample after the heat treatment.

TABLE 10

| Sample | Direction | Elongation (%) | Max Load (gf) | Tensile Strength (Mpa) | Young's Modulus (Mpa) | Heat Contraction Rate (area) (cm²) | Thickness Contraction Rate (um) |
|---|---|---|---|---|---|---|---|
| Resin Composition #1 130 degrees/7 min (FIG. 9B) | MD | 204.3 | 5655.0 | 34.7 | 400.5 | 15 × 15 → 15 × 15 0% contraction | 82 → 82 0% contraction |
| | TD | 186.9 | 4612.6 | 33.1 | 360.7 | | |
| Resin | MD | 187.3 | 4843.4 | 29.7 | 168.8 | 15 × 15 → | 78 → 78 |

TABLE 10-continued

| Sample | Direction | Elongation (%) | Max Load (gf) | Tensile Strength (Mpa) | Young's Modulus (Mpa) | Heat Contraction Rate (area) (cm$^2$) | Thickness Contraction Rate (um) |
|---|---|---|---|---|---|---|---|
| Composition #2 130 degrees/7 min (FIG. 9D) | TD | 186.9 | 4612.6 | 28.3 | 178.5 | 15 × 15 0% contraction | 0% contraction |

Heat Contraction Rate (area): Contraction rate of width × height

Thickness Contraction Rate: Average value of the thickness at each of nine spots marked on the film FIGS. 10A, 10B, 10C, and 10D illustratively show photographs of the base layer including the particle dispersion composition before and after the heat treatment according to one embodiment of the present invention.

Figures 10A, 10B, 10C, 10D:
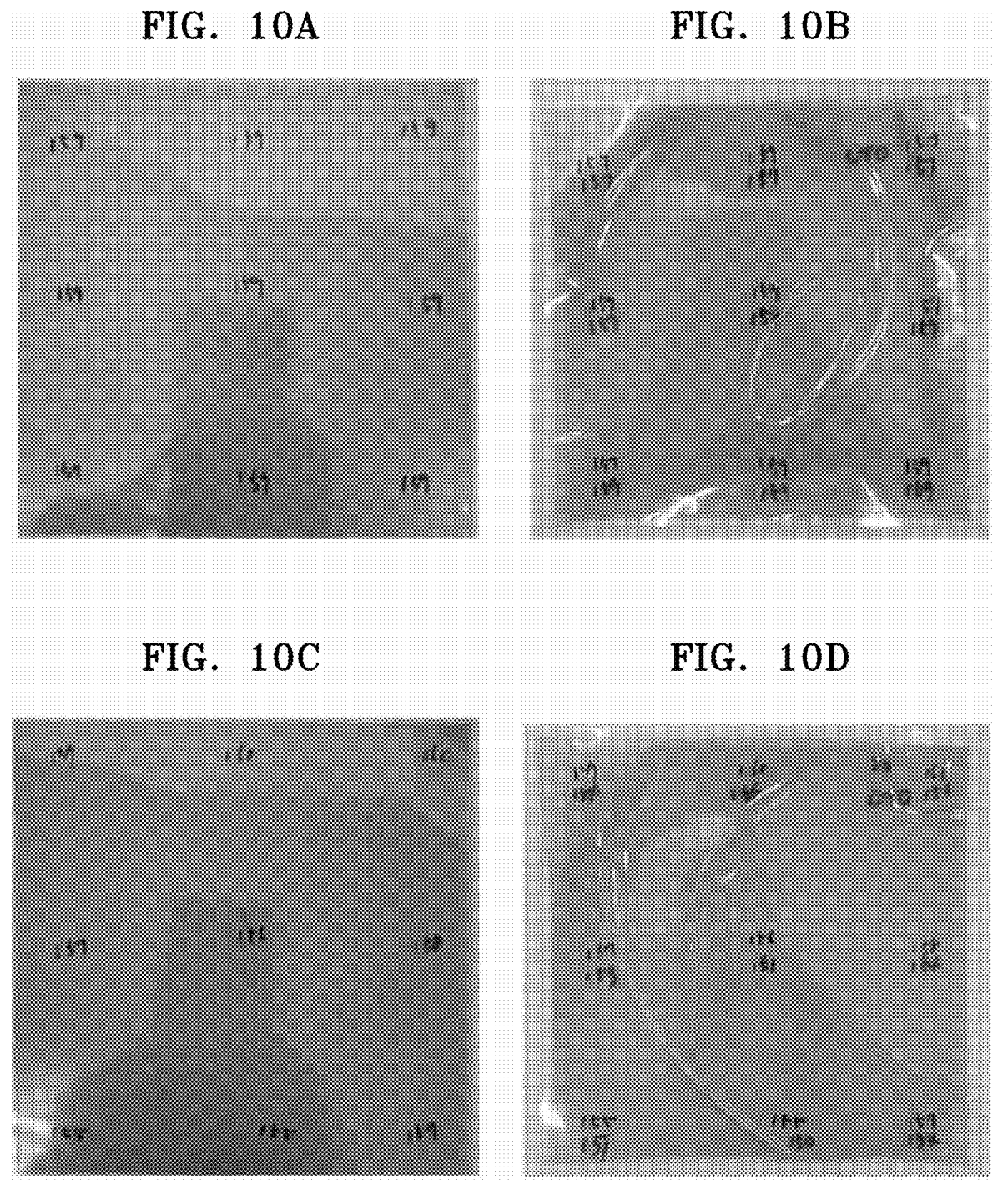

FIG. 10A shows a state in which a heat treatment is not performed on the base layer including CTO #1, FIG. 10B shows a state in which a heat treatment is performed on the base layer including CTO #1, FIG. 10C shows a state in which a heat treatment is not performed on the base layer including CTO #2, and FIG. 10D shows a state in which a heat treatment is performed on the base layer including CTO #2.

As shown in FIGS. 10B and 10D, the base layer including the particle dispersion composition including each of CTO #1 and CTO #2 contracted after the heat treatment (drying) at 130 degrees for 7 minutes. In particular, thickness reduction occurred. Table 11 summarizes physical properties (including a contraction rate) for each base layer including each sample after the heat treatment.

Figures 11A, 11B, 11C, 11D:
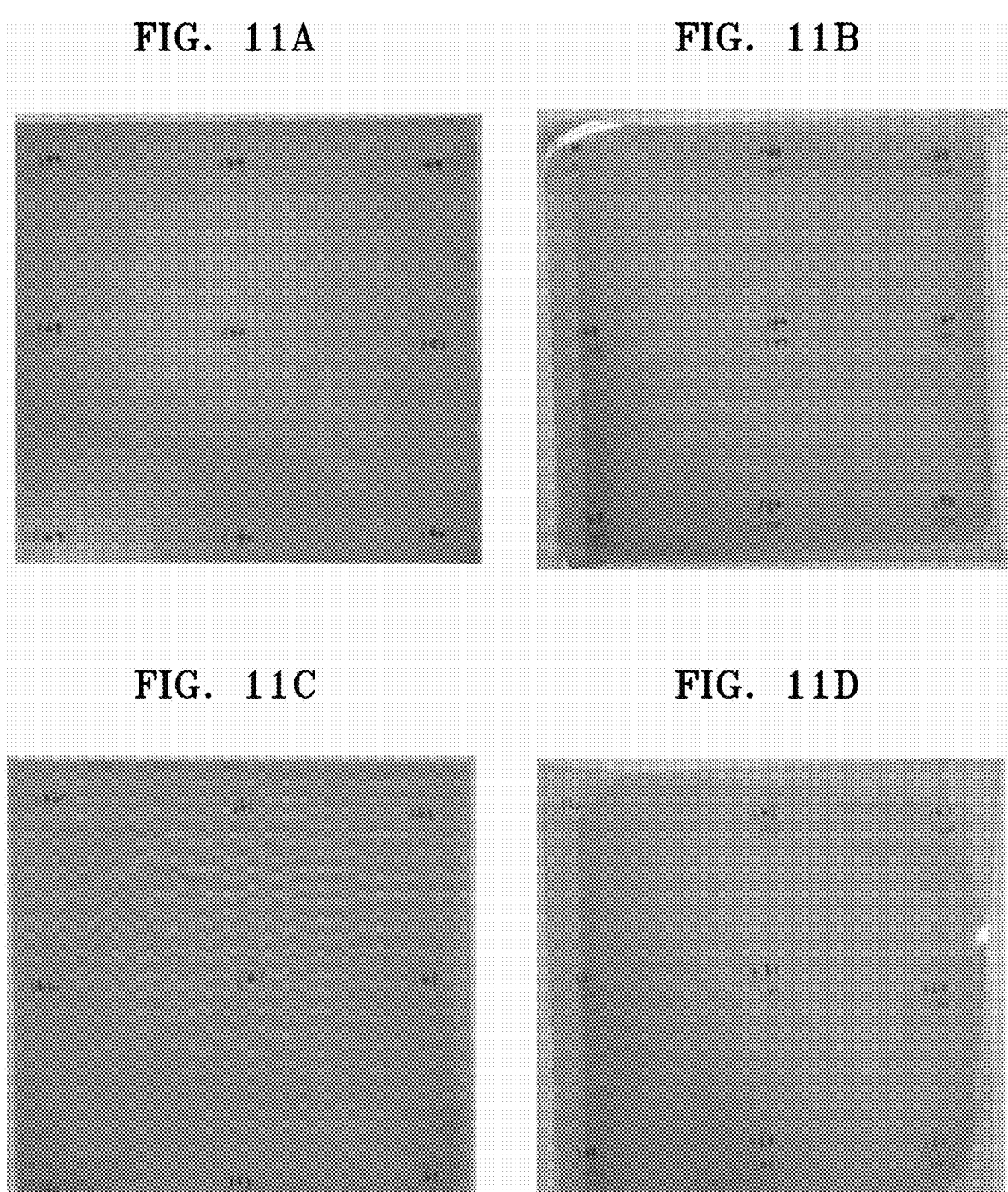
FIGS. 11A, 11B, 11C, and 11D illustratively show photographs of the base layer including the particle dispersion composition before and after the heat treatment according to one embodiment of the present invention.
Figures 12A, 12B, 12C, 12D:
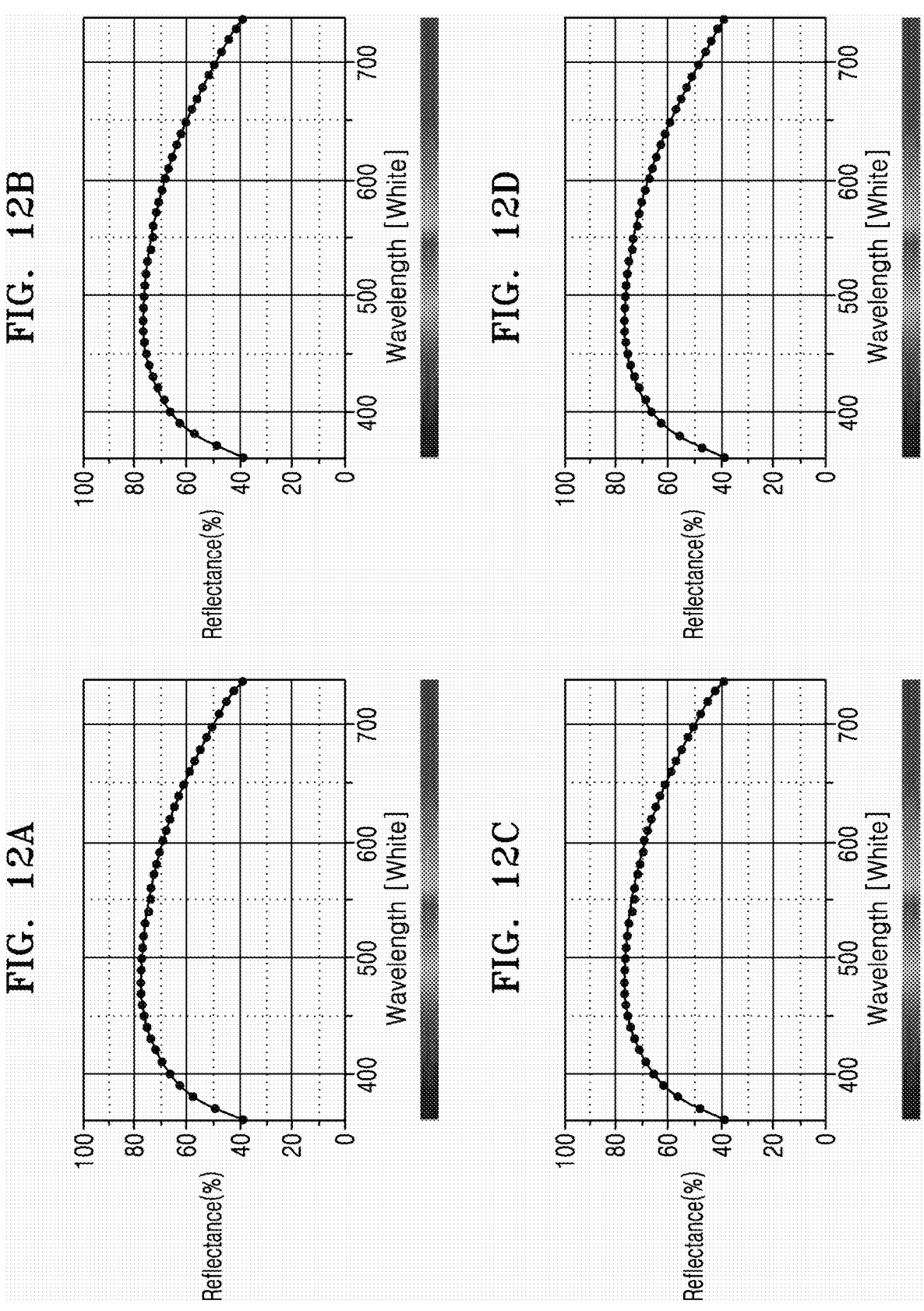
FIGS. 12A, 12B, 12C, and 12D show optical property test results of the base layer according to the type of the nanoceramic powder according to one embodiment of the present invention.

FIG. 11A shows a state in which a heat treatment is not performed on the base layer including CTO #4, FIG. 11B shows a state in which a heat treatment is performed on the base layer including CTO #4, FIG. 11C shows a state in which a heat treatment is not performed on the base layer including CTO #5, and FIG. 11D shows a state in which a heat treatment is performed on the base layer including CTO #5.

As shown in FIGS. 11B and 11D, the base layer including the particle dispersion composition including each of CTO #4 and CTO #5 did not heat-contract after the heat treatment (drying) at 130 degrees for 7 minutes.

FIGS. 12A, 12B, 12C, and 12D show optical property test results of the base layer according to the type of the nanoceramic powder according to one embodiment of the present invention, Table 12 summarizes optical property values for each base layer including each sample, and Table 13 summarizes physical properties (including a contraction rate) for each base layer including each sample before and after the heat treatment.

TABLE 11

| Sample | Direction | Elongation (%) | Max Load (gf) | Tensile Strength (Mpa) | Young's Modulus (Mpa) | Heat Contraction Rate (area) (cm$^2$) | Thickness Contraction Rate (um) |
|---|---|---|---|---|---|---|---|
| CTO #1 130 degrees/7 min (FIG. 10B) | MD TD | 203.5 141.3 | 5543.6 4703.7 | 34.0 28.8 | 457.8 459.0 | 15 × 15 → 14.4 × 14.4 7.8% contraction | 82 → 83.5 0% contraction |
| CTO #2 130 degrees/7 min (FIG. 10D) | MD TD | 212.0 249.8 | 3029.9 3541.2 | 18.6 21.7 | 88.7 69.7 | 15 × 15 → 14.2 × 14.2 10.4% contraction | 82 → 78 4.9% contraction |

As shown in FIGS. 9 and 10, the base layer including the particle dispersion composition including CTO #1 and CTO #2 had thickness reduction and a contraction issue after the heat treatment, so that there was a need to improve the solid of the particle dispersion composition.

Accordingly, tests were performed by using solids including the following CTOS.

CTO #4: AC03 16 pt

CTO #5: AC04 15.5 pt

CTO #6: AC04 16.5 pt

CTO #7: AC04 16 pt

CTO #8: AC03 16.5 pt

FIGS. 11A, 11B, 11C, and 11D illustratively show photographs of the base layer including the particle dispersion composition before and after the heat treatment according to one embodiment of the present invention.

TABLE 12

| Sample | Haze | Y | L* | a* | b* | VLT | UVR | IRR |
|---|---|---|---|---|---|---|---|---|
| CTO #4 (FIG. 12A) | 0.81 | 72.08 | 88.01 | −4.87 | −2.21 | 71.3 | 60.5 | 96.9 |
| CTO #5 (FIG. 12B) | 0.99 | 71.66 | 87.80 | −4.99 | −2.40 | 74.1 | 57.4 | 93.8 |
| CTO #4 130 degrees/ 7 min drying (FIG. 12C) | 1.01 | 71.65 | 87.80 | −4.98 | −1.97 | 70.8 | 63.0 | 97.5 |
| CTO #5 130 degrees/ 7 min drying (FIG. 12D) | 1.08 | 70.77 | 87.37 | −5.21 | −2.23 | 71.0 | 62.5 | 94.9 |

TABLE 13

| Sample | Direction | Elongation (%) | Max Load (gf) | Tensile Strength (MPa) | Young's Modulus (Mpa) | Heat Contraction Rate (area) (cm$^2$) | Thickness Contraction Rate (um) |
|---|---|---|---|---|---|---|---|
| CTO #4 | MD | 102.2 | 1326.4 | 8.13 | 33.61 | — | — |
| (FIG. 12A) | TD | 106.2 | 1633.5 | 10.02 | 40.46. | | |
| CTO #5 | MD | 99.5 | 1408.7 | 8.54 | 30.05 | — | — |
| (FIG. 12B) | TD | 115.4 | 1754.7 | 1076 | 24.86 | | |
| CTO #4 | MD | 112.6 | 2526.3 | 15.49 | 110.00 | 15 × 15 → 15 × 15 0% contraction | 74.7 → 74.4 0.3% contraction |
| 130 degrees/7 min drying (FIG. 12C) | TD | 125.6 | 2465.5 | 15.12 | 117.80 | | |
| CTO #5 | MD | 106.1 | 2396.5 | 14.69 | 114.67 | 15 × 15 → 15 × 15 0% contraction | 86.2 → 85.9 0.4% contraction |
| 130 degrees/7 min drying (FIG. 12D) | TD | 143.7 | 3276.2 | 20.09 | 96.42 | | |

As shown in FIG. 12, Table 12, and Table 13, when the solids including CTO #4 and CTO #5 are used, after the heat treatment, an area contracted by 0%, and thicknesses contracted by 0.3% and 0.4%, respectively.

FIGS. 13A, 13B, 13C, and 13D illustratively show photographs of the base layer including the particle dispersion composition before and after the heat treatment according to one embodiment of the present invention.

Figures 13A, 13B, 13C, 13D:
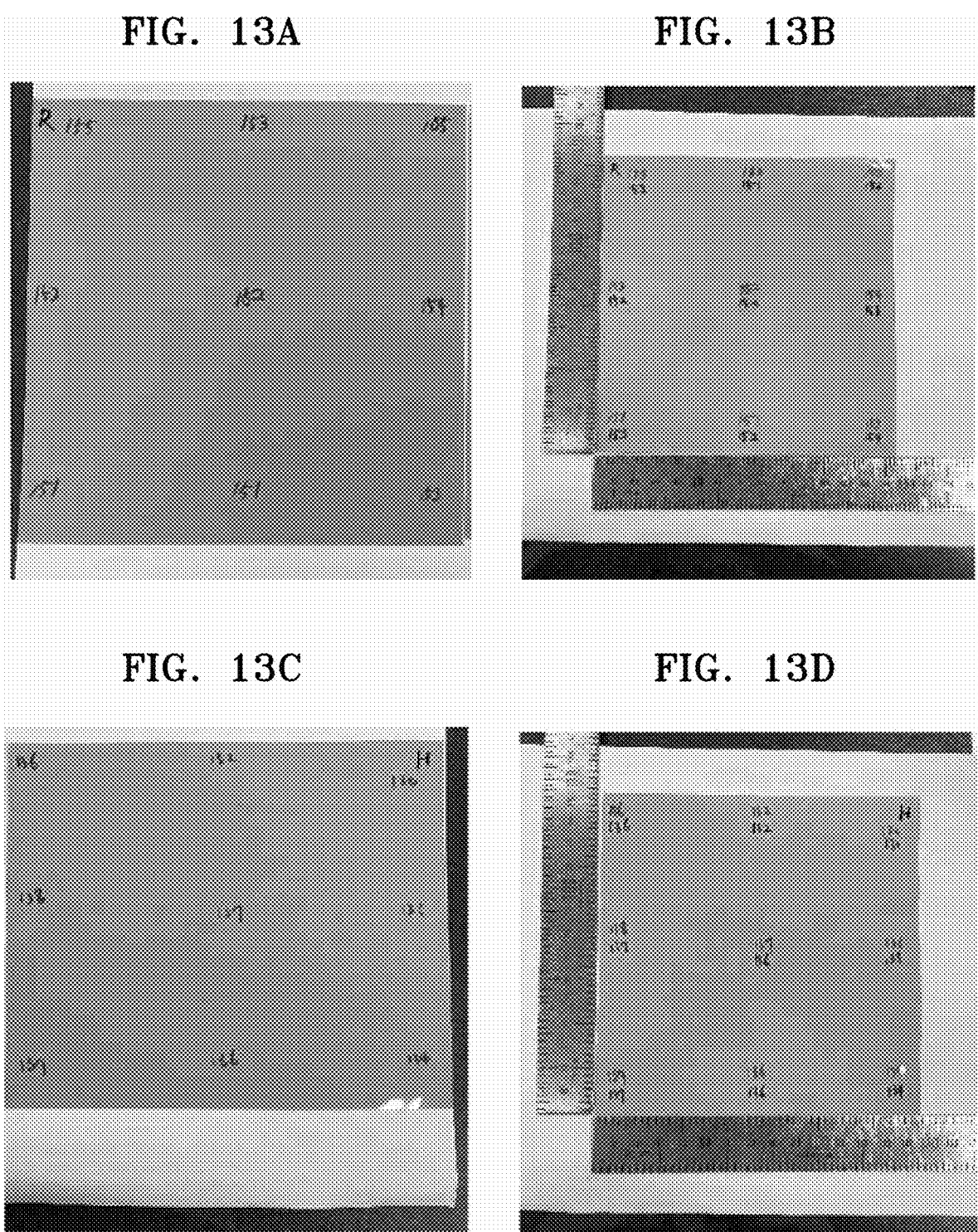
FIGS. 13A, 13B, 13C, and 13D illustratively show photographs of the base layer including the particle dispersion composition before and after the heat treatment according to one embodiment of the present invention.

FIG. 13A shows a state in which a heat treatment is not performed on the base layer including CTO #6, FIG. 13B shows a state in which a heat treatment is performed on the base layer including CTO #6, FIG. 13C shows a state in which a heat treatment is not performed on the base layer including CTO #7, and FIG. 13D shows a state in which a heat treatment is performed on the base layer including CTO #7.

As shown in FIGS. 13B and 13D, the base layer including the particle dispersion composition including each of CTO #6 and CTO #7 had almost no thickness reduction after the heat treatment (drying) at 130 degrees for 7 minutes.

FIGS. 14A, 14B, 14C, and 14D show optical property test results of the base layer according to the type of the nanoceramic powder according to one embodiment of the present invention, Table 14 summarizes optical property values for each base layer including each sample, and Table 15 summarizes physical properties (including a contraction rate) for each base layer including each sample before and after the heat treatment.

TABLE 14

| Sample | Haze | Y | L* | a* | b* | VLT | UVR | IRR |
|---|---|---|---|---|---|---|---|---|
| CTO #6 (FIG. 14A) | 0.54 | 67.40 | 85.71 | −6.77 | −3.98 | 71.1 | 63.2 | 98.7 |
| CTO #7 (FIG. 14B) | 1.26 | 69.42 | 86.71 | −6.14 | −3.77 | 71.9 | 61.9 | 98.0 |
| CTO #6 130 degrees/ 7 min drying (FIG. 14C) | 0.67 | 67.25 | 85.63 | −6.84 | −3.82 | 70.7 | 64.9 | 98.7 |
| CTO #7 130 degrees/ 7 min drying (FIG. 14D) | 1.64 | 69.45 | 86.73 | −6.13 | −3.64 | 71.5 | 61.8 | 97.8 |

TABLE 15

| Sample | Direction | Elongation (%) | Max Load (gf) | Tensile Strength (MPa) | Young's Modulus (Mpa) | Heat Contraction Rate (area) (cm$^2$) | Thickness Contraction Rate (um) |
|---|---|---|---|---|---|---|---|
| CTO #6 | MD | 151 | 3430 | 10.85 | 78.92 | — | — |
| (FIG. 14A) | TD | 170 | 4167 | 13.19 | 74.29 | | |
| CTO #7 | ML | 179 | 2677 | 9.79 | 29.78 | — | |
| (FIG. 14B) | TD | 148 | 2105 | 7.65 | 33.12 | | |
| CTO #6 | MI | 176 | 5648 | 18.35 | 140.09 | 15 × 15 → 14.5 × 14.5 6.6% contraction | 153 → 152 0.65% contraction |
| 130 degrees/7 min drying (FIG. 14C) | TD | 128 | 5196 | 16.99 | 176.48 | | |
| CTO #7 | MI | 118 | 2539 | 9.23 | 56.18 | 15 × 15 → 14.5 × 14.6 5.9% contraction | 136 → 135 0.7% contraction |
| 130 degrees/7 min drying (FIG. 14D) | TD | 113 | 2422 | 8.80 | 46.58 | | |

As shown in FIG. 14, Table 14, and Table 15, when the solids including CTO #6 and CTO #7 are used, after the heat treatment, areas contracted by 6.6% and 5.9%, respectively, and thicknesses contracted by 0.65% and 0.07%, respectively.

FIGS. 15A, 15B, 15C, and 15D illustratively show photographs of the base layer including the particle dispersion composition before and after the heat treatment according to one embodiment of the present invention.

FIG. 15A shows a state in which a heat treatment is not performed on the base layer including CTO #4, FIG. 15B shows a state in which a heat treatment is performed on the base layer including CTO #4, FIG. 15C shows a state in which a heat treatment is not performed on the base layer including CTO #8, and FIG. 15D shows a state in which a heat treatment is performed on the base layer including CTO #8.

As shown in FIGS. 15B and 15D, the base layer including the particle dispersion composition including each of CTO #4 and CTO #8 had almost no thickness reduction after the heat treatment (drying) at 130 degrees for 7 minutes.

Figures 16A, 16B, 16C:
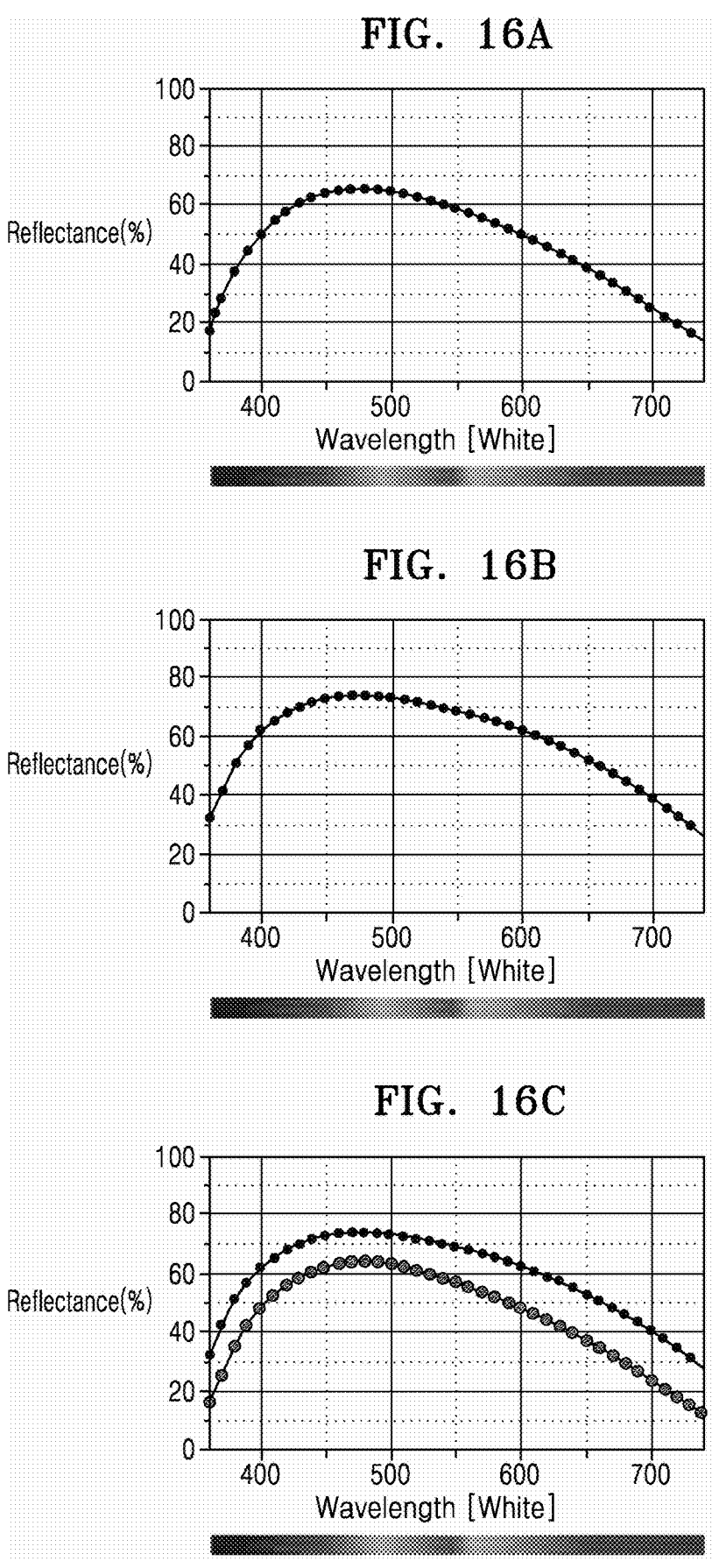
FIGS. 16A, 16B, and 16C show optical property test results of the base layer according to the type of the nanoceramic powder according to one embodiment of the present invention.

FIGS. 16A, 16B, and 16C show optical property test results of the base layer according to the type of the nanoceramic powder according to one embodiment of the present invention, Table 16 summarizes optical property values for each base layer including each sample, and Table 17 summarizes physical properties (including a contraction rate) for each base layer including each sample before and after the heat treatment.

TABLE 16

| Sample | Haze | Y | L* | a* | b* | VLT | UVR | IRR |
|---|---|---|---|---|---|---|---|---|
| CTO #4 (FIG. 16A) | 1.70 | 56.66 | 79.99 | −9.45 | −5.41 | 59.4 | 79.7 | 99.9 |
| CTO #8 (FIG. 16B) | 3.98 | 66.54 | 85.27 | −6.64 | −3.87 | 68.6 | 66.2 | 99.1 |
| CTO #4 130 degrees/ 7 min drying (red graph of FIG. 16C) | 2.04 | 55.57 | 79.37 | −9.75 | −5.24 | 58.2 | 82.3 | 99.9 |
| CTO #8 130 degrees/ 7 min drying (blue graph of FIG. 16C) | 3.75 | 67.57 | 85.79 | −6.36 | −3.43 | 67.6 | 69.2 | 98.9 |

TABLE 17

| Sample | Direction | Elongation (%) | Max Load (gf) | Tensile Strength (Mpa) | Young's Modulus (Mpa) | Heat Contraction Rate (area) (cm²) | Thickness Contraction Rate (um) |
|---|---|---|---|---|---|---|---|
| CTO #4 (FIG. 16A) | MD | 191 | 2209 | 6.77 | 15.13 | — | — |
| | TD | 157 | 1604 | 5.08 | 16.59 | | |
| CTO #8 (FIG. 16B) | MD | 163 | 2159 | 10.27 | 38.38 | — | — |
| | TD | 93 | 1233 | 6.05 | 45.41 | | |
| CTO #4 130 degrees/7 min drying (red graph of FIG. 16C) | MD | 157 | 5211 | 15.97 | 71.31 | 15 × 15 → 14.5 × 14.5 6.6% contraction | 156 → 156 0% contraction |
| | TD | 179 | 4335 | 13.29 | 61.36 | | |
| CTO #8 130 degrees/7 min drying (blue graph of FIG. 16C) | MD | 134 | 2669 | 13.09 | 72.66 | 15 × 15 → 14.7 × 14.7 3.9% contraction | 97 → 96 0.01% contraction |
| | TD | 136 | 2514 | 12.33 | 67.32 | | |

As shown in FIG. 16, Table 16, and Table 17, when the solids including CTO #4 and CTO #8 are used, after the heat treatment, areas contracted by 6.6% and 3.9%, respectively, and thicknesses contracted by 0% and 0.01%, respectively.

In other words, when compared with FIG. 14, Table 14, and Table 15 described above, the thickness contraction rate of the base layer after the heat treatment may be effectively improved.

Figures 17A, 17B:
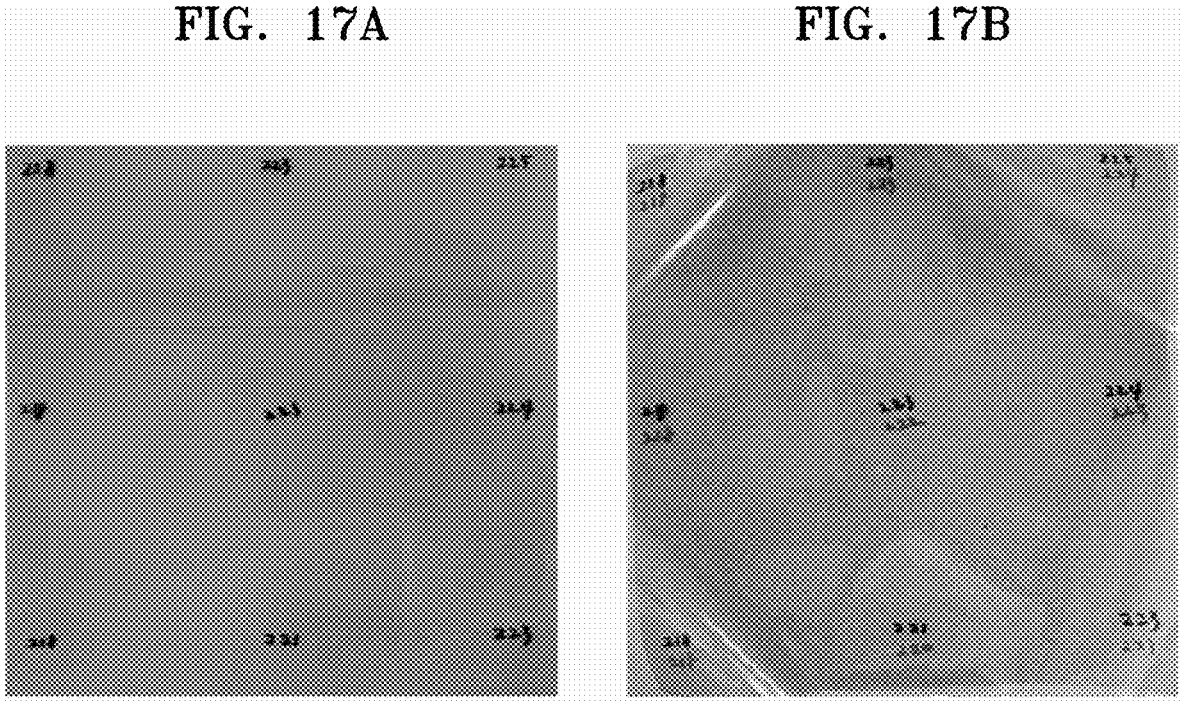
FIGS. 17A and 17B illustratively show photographs of the base layer including the particle dispersion composition before and after the heat treatment according to one embodiment of the present invention.

FIGS. 17A and 17B illustratively show photographs of the base layer including the particle dispersion composition before and after the heat treatment according to one embodiment of the present invention.

FIG. 17A shows a state in which a heat treatment is not performed on the base layer including CTO #4 and MIBK, and FIG. 17B shows a state in which a heat treatment is performed on the base layer including CTO #4 and MIBK.

As shown in FIG. 17B, the base layer including the particle dispersion composition including CTO #4 and MIBK had almost no thickness reduction after the heat treatment (drying) at 130 degrees for 7 minutes.

Figures 18A, 18B:
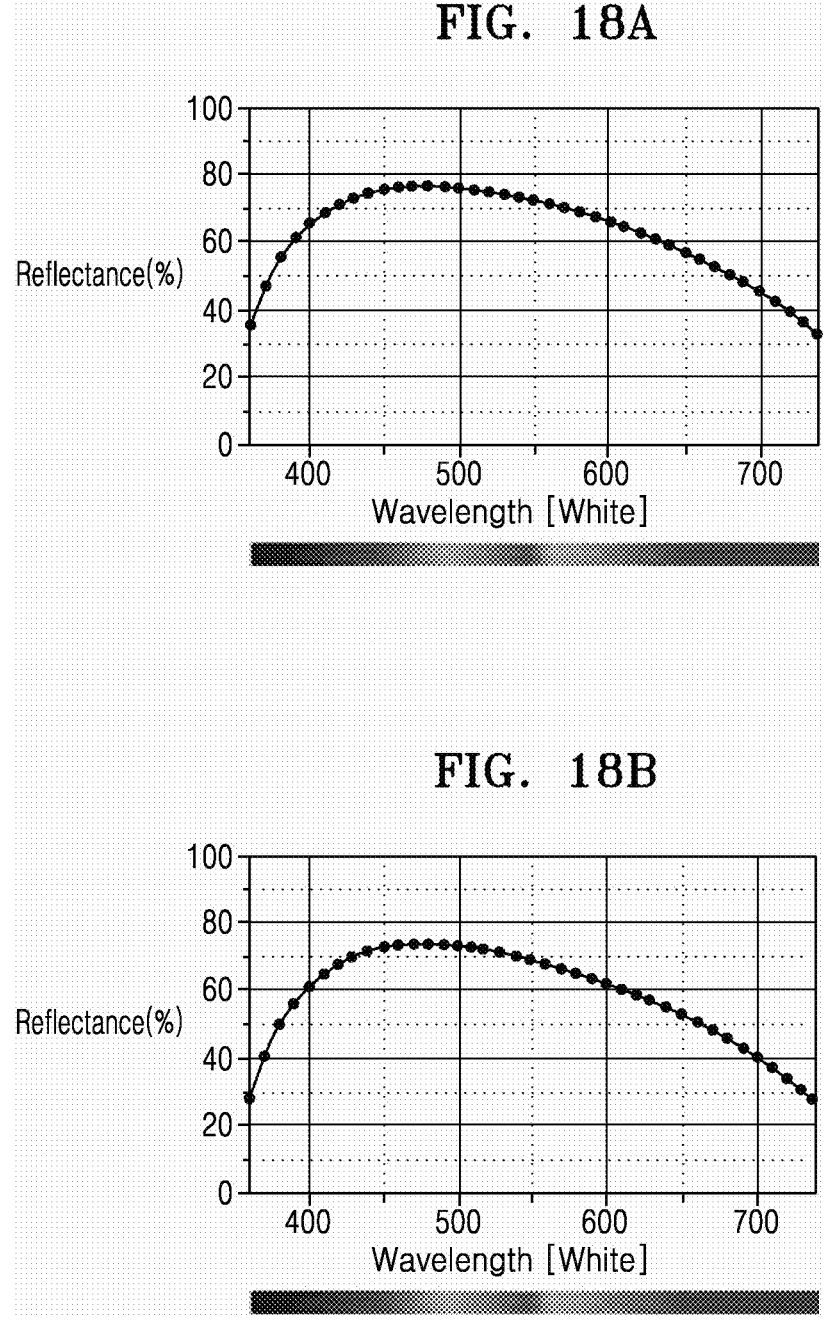
FIGS. 18A and 18B show optical property test results of the base layer according to the type of the nanoceramic powder according to one embodiment of the present invention.

FIGS. 18A and 18B show optical property test results of the base layer according to the type of the nanoceramic powder according to one embodiment of the present invention, Table 18 summarizes optical property values for each base layer including each sample, and Table 19 summarizes the physical properties (including a contraction rate) for each base layer including each sample before and after the heat treatment.

TABLE 18

| Sample | Haze | Y | L* | a* | b* | VLT | UVR | IRR |
|---|---|---|---|---|---|---|---|---|
| CTO #4 + MIBK (FIG. 18A) | 0.90 | 70.19 | 87.09 | −5.80 | −3.23 | 73.4 | 60.1 | 96.9 |
| CTO #4 + MIBK | 1.20 | 66.92 | 85.47 | −6.74 | −3.64 | 70.6 | 65.4 | 98.7 |

TABLE 18-continued

| Sample | Haze | Y | L* | a* | b* | VLT | UVR | IRR |
|---|---|---|---|---|---|---|---|---|
| 130 degrees/ 7 min drying (FIG. 18B) | | | | | | | | |

TABLE 19

| Sample | Direction | Elongation (%) | Max Load (gf) | Tensile Strength (Mpa) | Young's Modulus (Mpa) | Heat Contraction Rate (area) (cm²) | Thickness Contraction Rate (um) |
|---|---|---|---|---|---|---|---|
| CTO #4 + MIBK (FIG. 18A) | MD | 162 | 2164 | 7.08 | 8.27 | — | — |
| | TD | 129 | 1459 | 4.77 | 8.13 | | |
| CTO #4 + MIBK 130 degrees/7 min | MD | 213 | 6179 | 20.21 | 155.38 | 15 × 15 → 13.5 ×13.5 0% | 149 → 149 |
| | TD | 191 | 5189 | 16.97 | 129.55 | | |

TABLE 19-continued

| Sample | Direction | Elongation (%) | Max Load (gf) | Tensile Strength (Mpa) | Young's Modulus (Mpa) | Heat Contraction Rate (area) (cm²) | Thickness Contraction Rate (um) |
|---|---|---|---|---|---|---|---|
| drying (FIG. 18B) | | | | | | 19% contraction | contraction |

As shown in FIG. 18, Table 18, and Table 19, when CTO #4 and MIBK are included, after the heat treatment, an area contracted by 198, and a thickness contracted by 0%.

Meanwhile, when taking in to consideration that haze is increased when a content of the dispersant is increased, haze is increased when MEK is used as the solvent, and an IRR is proportional to a content of the nanoceramic powder, base layers were formed by using particle dispersion compositions having contents shown in Table 20 below to perform additional tests.

The particle dispersion compositions prepared in the present test commonly used CTO as the nanoceramic powder of the solid, and commonly used MIBK as the solvent. In particular, the particle dispersion compositions include the following CTOs, respectively.

Particle Dispersion Composition #1: ST-CTO-AC03 S01 10 pt
Particle Dispersion Composition #2: ST-CTO-AC03 S02 10 pt
Particle Dispersion Composition #3: ST-CTO-AC03 S03 10 pt
Particle Dispersion Composition #4: ST-CTO-AC03 S04 9.5 pt

TABLE 20

| Sample | CTO | Dispersant + Stabilizer | Solid | Solvent | Actual Solid 170 degrees/ 20 min | Expected CTO compared to Solid |
|---|---|---|---|---|---|---|
| Particle Dispersion Composition #1 | 21.8 | 27.2 | 49.0 | MIBK | 49.2 | 44.48% |
| Particle Dispersion Composition #2 | 24.8 | 31.0 | 55.8 | MIBK | 59.3 | 44.44% |
| Particle Dispersion Composition #3 | 24.0 | 30.0 | 54.0 | MIBK | 58.2 | 44.44% |
| Particle Dispersion Composition #4 | 27.9 | 27.9 | 55.8 | MIBK | 60.9 | 50.0% |

FIGS. 19A, 19B, 19C, 19D, 19E, 19F, 19G, and 19H illustratively show photographs of the base layer including the particle dispersion composition before and after the heat treatment according to one embodiment of the present invention.

Figures 19A, 19B, 19C, 19D, 19E, 19F, 19G, 19H:
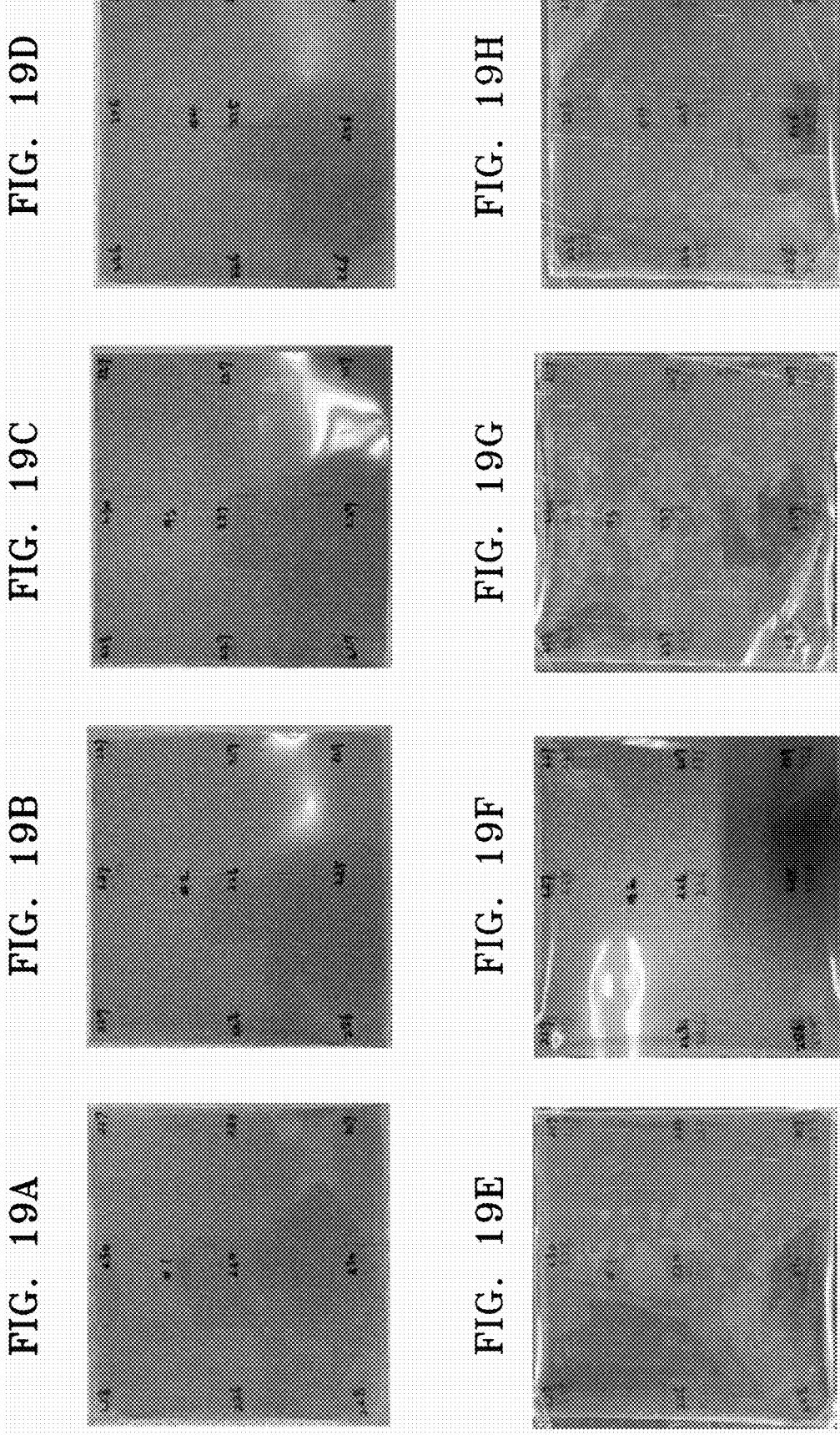
FIGS. 19A, 19B, 19C, 19D, 19F, 19E, 19G, and 19H illustratively show photographs of the base layer including the particle dispersion composition before and after the heat treatment according to one embodiment of the present invention.
Figures 20A, 20B, 20C, 20D:
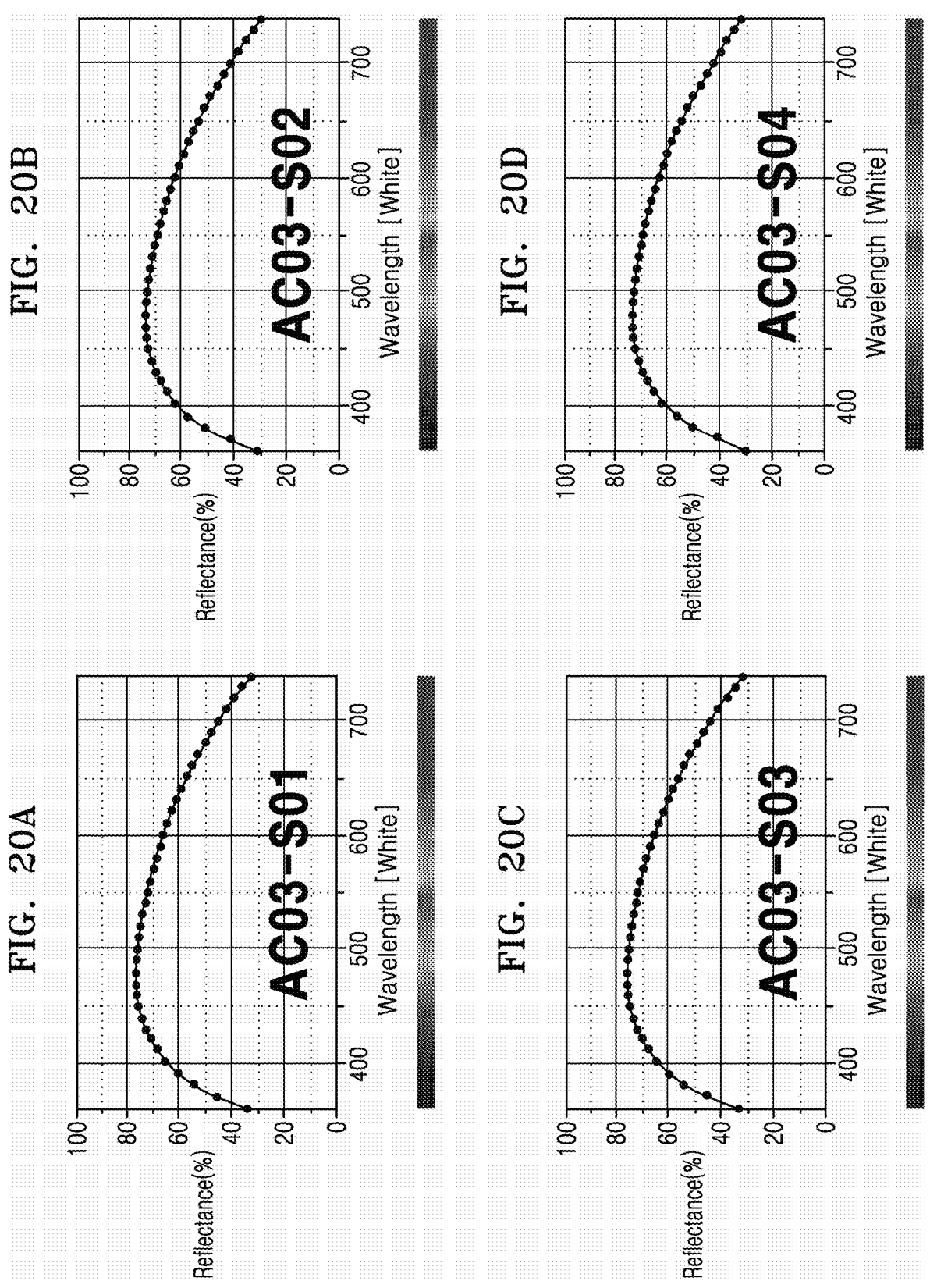
FIGS. 20A, 20B, 20C, 20D, 20E, 20F, 20G, and 20H show optical property test results of the base layer according to the type of the nanoceramic powder according to one embodiment of the present invention.
Figures 20E, 20F, 20G, 20H:
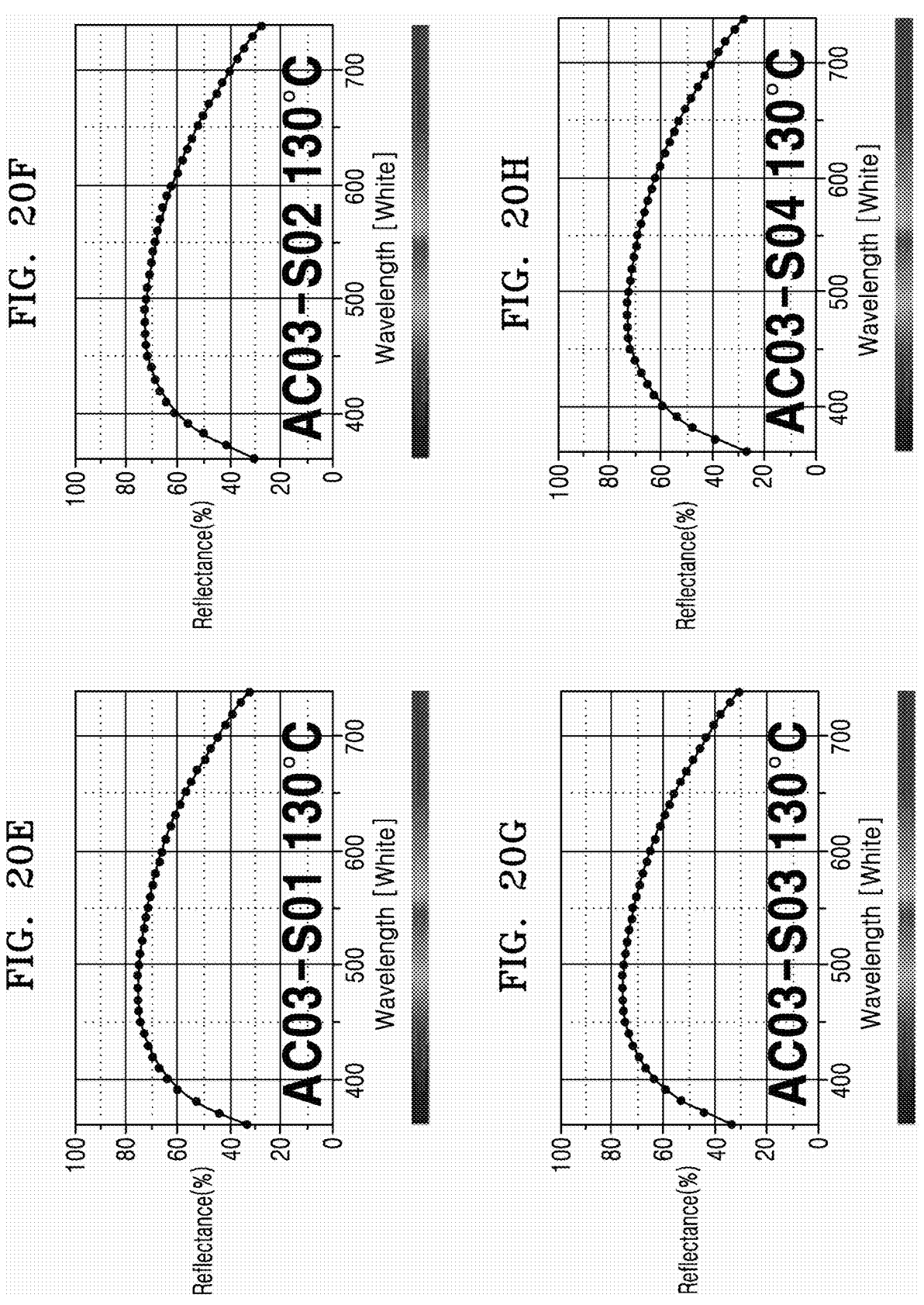

FIG. 19A shows a state in which a heat treatment is not performed on the base layer including Particle Dispersion Composition #1, FIG. 19B shows a state in which a heat treatment is not performed on the base layer including Particle Dispersion Composition #2, FIG. 19C shows a state in which a heat treatment is not performed on the base layer including Particle Dispersion Composition #3, FIG. 19D shows a state in which a heat treatment is not performed on the base layer including Particle Dispersion Composition #4, FIG. 19E shows a state in which a heat treatment is performed on the base layer including Particle Dispersion Composition #1, FIG. 19F shows a state in which a heat treatment is performed on the base layer including Particle Dispersion Composition #2, FIG. 19G shows a state in which a heat treatment is performed on the base layer including Particle Dispersion Composition #3, and FIG. 19H shows a state in which a heat treatment is performed on the base layer including Particle Dispersion Composition #4.

As shown in FIGS. 19E to 19H, the base layer including each of Particle Dispersion Composition #1 to Particle Dispersion Composition #4 had almost no thickness reduction after the heat treatment (drying) at 130 degrees for 7 minutes.

FIGS. 20A, 20B, 20C, 20D, 20E, 20F, and 20G show optical property test results of the base layer according to the type of the nanoceramic powder according to one embodiment of the present invention, Table 21 summarizes optical property values for each base layer including each sample before the heat treatment, Table 22 summarizes optical property values for each base layer including each sample after the heat treatment, and Table 23 summarizes physical properties (including a contraction rate) for each base layer including each sample after the heat treatment.

TABLE 21

| Sample | Haze | Y | L* | a* | b* | VLT | UVR | IRR |
|---|---|---|---|---|---|---|---|---|
| Particle Dispersion Composition #1 (FIG. 20A) | 0.93 | 70.47 | 87.23 | −5.80 | −3.02 | 71.9 | 65.6 | 97.9 |
| Particle Dispersion Composition #2 (FIG. 20B) | 1.04 | 67.66 | 85.83 | −6.52 | −3.44 | 70.2 | 66.9 | 98.6 |
| Particle Dispersion Composition #3 (FIG. 20C) | 1.06 | 69.95 | 86.97 | −5.93 | −3.06 | 72.1 | 63.8 | 97.6 |
| Particle Dispersion Composition #4 (FIG. 20D) | 1.18 | 68.32 | 86.17 | −6.23 | −2.94 | 69.3 | 69.6 | 98.4 |

TABLE 22

| Sample | Haze | Y | L* | a* | b* | VLT | UVR | IRR |
|---|---|---|---|---|---|---|---|---|
| Particle Dispersion Composition #1 (FIG. 20E) | 1.43 | 69.54 | 86.77 | −6.07 | −2.84 | 72.6 | 62.6 | 97.6 |

TABLE 22-continued

| Sample | Haze | Y | L* | a* | b* | VLT | UVR | IRR |
|---|---|---|---|---|---|---|---|---|
| Particle Dispersion Composition #2 (FIG. 20F) | 1.29 | 67.21 | 85.61 | −6.66 | −3.25 | 70.6 | 65.4 | 98.4 |
| Particle Dispersion Composition #3 (FIG. 20G) | 1.50 | 69.50 | 86.75 | −6.05 | −2.82 | 72.7 | 62.1 | 97.6 |
| Particle Dispersion Composition #4 (FIG. 20H) | 1.45 | 66.98 | 85.49 | −6.62 | −2.79 | 70.8 | 66.7 | 97.9 | prepared by a heat curing scheme on lower and upper sides of a base layer, respectively, so that a residual solvent remaining in the base layer may be volatilized to minimize a solvent content of the base layer.

According to one embodiment of the present invention, a residual solvent in a base layer may be minimized, so that film contraction and curling may be effectively prevented.

The descriptions of the embodiments set forth herein are provided to enable any person having ordinary skill in the art to use or implement the present invention. It will be apparent to a person having ordinary skill in the art that various modifications can be made to the embodiments, and general principles defined herein may be applied to other embodiments without departing from the scope of the present invention. Accordingly, the present invention is not limited to the embodiments set forth herein, but is to be construed in the broadest scope consistent with the principles and novel features set forth herein.

TABLE 23

| | | RT (FIGS. 20A to 20D) | | 130 degrees/7 min (FIGS. 20E to 20H) | | RT (FIGS. 20A to 20D) | | 130 degrees/7 min (FIGS. 20E to 20H) | | 130 degrees/7 min Heat Contraction Evaluation | |
|---|---|---|---|---|---|---|---|---|---|---|---|
| | | Elongation | Max Load | Elongation | Max Load | Tensile Strength | Young's Modulus | Tensile Strength | Young's Modulus | Heat Contraction Rate (area) | Thickness Contraction Rate |
| Sample | Direction | (%) | (gf) | (%) | (gf) | (Mpa) | (Mpa) | (Mpa) | (Mpa) | (cm²) | (um) |
| Particle Dispersion Composition #1 | MD | 208 | 2432 | 185 | 4575 | 7.95 | 16.80 | 14.96 | 55.00 | 15 × 15 → 14.6 × 14.6 5% or more contraction | 154 → 153 |
| | TD | 203 | 2715 | 175 | 4315 | 8.88 | 16.80 | 14.11 | 49.52 | | |
| Particle Dispersion Composition #2 | MD | 211 | 3494 | 197 | 4734 | 11.43 | 19.15 | 15.48 | 57.84 | 15 × 15 → 14.8 × 14.8 3% or more contraction | 152 → 150 |
| | TD | 205 | 2907 | 190 | 4714 | 9.50 | 18.52 | 15.42 | 53.54 | | |
| Particle Dispersion Composition #3 | MD | 203 | 2485 | 222 | 4413 | 8.13 | 21.57 | 14.43 | 71.03 | 15 × 15 → 14.6 × 14.6 5% or more contraction | 153 → 151 |
| | TD | 203 | 2548 | 203 | 5013 | 8.33 | 16.45 | 16.39 | 78.39 | | |
| Particle Dispersion Composition #4 | MD | 201 | 3498 | 196 | 4590 | 11.44 | 18.45 | 15.01 | 77.25 | 15 × 15 → 14.8 × 14.8 3% or more contraction | 151 → 150 |
| | TD | 185 | 29121 | 187 | 4544 | 9.52 | 17.10 | 14.86 | 60.21 | | |

According to one embodiment of the present invention, an overall protective film may be formed of a material having elasticity, so that the protective film may be installed on a curved surface portion of a vehicle glass without a thermoforming process to improve installability of a worker.

According to one embodiment of the present invention, a base layer may include a particle dispersion composition, so that a heat shielding function of shielding 80% or more of infrared rays may be implemented to protect a glass while adjusting sunlight.

According to one embodiment of the present invention, a protective film having a visible light transmittance that is adjustable in a range of 0.5 to 80% may be provided by a colored pigment added to a colored adhesive layer.

According to one embodiment of the present invention, a particle dispersion composition including a solid, which has an increased content focusing on a dispersant and a stabilizer, and a special solvent may be added to a base layer, so that smoothness and optical properties of the base layer may be ensured, and film contraction during a manufacturing process may be prevented to improve quality of a protective film.

According to one embodiment of the present invention, a colored adhesive layer and a self-healing layer may be

What is claimed is:

1. A protective film for a vehicle glass with a heat shielding function of shielding 80% or more of infrared rays, the protective film comprising:

a colored adhesive layer including an acrylic copolymer and a colored pigment;

a base layer disposed on the colored adhesive layer, and including a mixture solution formed by mixing a resin composition including an acrylic oligomer and a urethane oligomer and a particle dispersion composition including a solid and a solvent with each other; and a self-healing layer disposed on the base layer, including a urethane resin and an isocyanate curing agent, capable of recovering from a scratch, wherein the resin composition includes 70 to 90 parts by weight of the acrylic oligomer and 35 to 55 parts by weight of the urethane oligomer, wherein the base layer includes 1 to 30 parts by weight of the particle dispersion composition based on 100 parts by weight of the mixture solution, wherein the solid includes nanoceramic powder, a dispersant, and a stabilizer, and the protective film is attached to a curved vehicle windshield without a thermoforming process due to elasticity of the base layer and the self-healing layer so as to protect the vehicle windshield while shielding heat caused by sunlight.

2. The protective film of claim 1, wherein the protective film has a hardness of 80 to 95 A based on Shore A hardness.

3. The protective film of claim 1, wherein the base layer includes 30 to 60 parts by weight of the solid based on 100 parts by weight of the particle dispersion composition.

4. The protective film of claim 1, wherein the solid includes 10 to 200 parts by weight of the dispersant and the stabilizer based on 100 parts by weight of the nanoceramic powder.

5. The protective film of claim 1, wherein the nanoceramic powder includes CTO.

6. The protective film of claim 1, wherein the base layer is formed by preparing the resin composition including the acrylic oligomer and the urethane oligomer, preparing the particle dispersion composition including the solid and the solvent, mixing the prepared resin composition and the prepared particle dispersion composition with each other to form the mixture solution, applying the mixture solution between two sheets of release paper through a preset device, and performing ultraviolet curing on the mixture solution.

7. The protective film of claim 6, wherein the base layer is formed on a bottom surface thereof with the colored adhesive layer and formed on a top surface thereof with the self-healing layer, when the colored adhesive layer is formed, the bottom surface of the base layer is heat-cured during a heat treatment at a temperature of 80 to 150° C. after being coated with an adhesive composition including an acrylic copolymer and a colored pigment, and, when the self-healing layer is formed, the top surface of the base layer is heat-cured during a heat treatment at a temperature of 80 to 150° C. after being coated with a surface composition including a urethane resin and an isocyanate curing agent.

* * * * *